(12) United States Patent
Manning et al.

(10) Patent No.: US 11,390,832 B2
(45) Date of Patent: Jul. 19, 2022

(54) ENZYMATIC DEGRADATION OF MYCOTOXINS DURING GRAIN PROCESSING

(71) Applicant: Poet Research, Inc., Sioux Falls, SD (US)

(72) Inventors: Andrew J. Manning, Sioux Falls, SD (US); Steven T. Bly, Sioux Falls, SD (US)

(73) Assignee: POET Research, Inc., Sioux Falls, SD (US)

( * ) Notice: Subject to any disclaimer, the term of this patent is extended or adjusted under 35 U.S.C. 154(b) by 0 days.

(21) Appl. No.: 17/390,637

(22) Filed: Jul. 30, 2021

(65) Prior Publication Data

US 2021/0403842 A1    Dec. 30, 2021

Related U.S. Application Data

(63) Continuation of application No. 17/199,274, filed on Mar. 11, 2021.

(60) Provisional application No. 62/988,670, filed on Mar. 12, 2020.

(51) Int. Cl.
```
C12C 5/00      (2006.01)
A23K 10/14     (2016.01)
A23K 10/12     (2016.01)
C12C 11/00     (2006.01)
```

(52) U.S. Cl.
CPC .............. *C12C 5/004* (2013.01); *A23K 10/12* (2016.05); *A23K 10/14* (2016.05); *C12C 11/00* (2013.01)

(58) Field of Classification Search
CPC ......... C12C 5/004; C12C 11/00; A23K 10/12; A23K 10/14

USPC .......................................................... 426/13
See application file for complete search history.

(56) References Cited

U.S. PATENT DOCUMENTS

| | | |
|---|---|---|
| 8,703,460 B2 | 4/2014 | Moll et al. |
| 9,901,108 B2 | 2/2018 | Mann |
| 9,902,830 B2 | 2/2018 | Yiannikouris |
| 10,131,866 B2 | 11/2018 | Elend |
| 10,149,489 B2 | 12/2018 | Fruhauf |
| 10,450,271 B2 | 10/2019 | Trail |

(Continued)

FOREIGN PATENT DOCUMENTS

| | | |
|---|---|---|
| EP | 3157538 B1 | 5/2019 |
| EP | 2677881 B1 | 4/2020 |

(Continued)

OTHER PUBLICATIONS

Khatibi, P. A. et al. Biotech. for Biofuel. 4: 26 (Year: 2011).*

(Continued)

*Primary Examiner* — Hamid R Badr
(74) *Attorney, Agent, or Firm* — FisherBroyles, LLP; Cara L. Crowley-Weber; Cary Reeves

(57) ABSTRACT

Methods, compositions, and systems for steeping, propagation and fermentation, particularly large-scale operations for production of starch and ethanol and fermentation product streams are provided. Addition of mycotoxin mitigating enzymes or microorganisms expressing mycotoxin mitigating enzymes to steeping, propagation, and/or fermentation tanks, and/or to post-fermentation product streams, mitigates mycotoxin levels in fermentation co-products obtained from mycotoxin contaminated feedstocks.

15 Claims, 5 Drawing Sheets

Specification includes a Sequence Listing.

| Source of Enzymatic System | % of Control Final Ethanol Titer | % DON Mitigated by System |
|---|---|---|
| Average Control | 100% | 0 |
| Average *P. pastoris* Lysate | 99.6% | 94% |
| Average *P. pastoris* Purified Enzyme | 100% | 94% |
| Average *S. cerevisiae* Lysate | 100.4% | 99% |
| Average *S. cerevisiae* Purified Enzyme | 100.5% | 99% |
| Average *E. coli* Lysate | 100.3% | 96% |
| Average *E. coli* Purified Enzyme | 99.6% | 93% |

(56) References Cited

U.S. PATENT DOCUMENTS

| | | |
|---|---|---|
| 10,531,662 B2 | 1/2020 | Strasburg |
| 10,598,661 B2 | 3/2020 | Sarver, Jr |
| 10,721,950 B2 | 7/2020 | Cecava |
| 11,136,561 B2 | 10/2021 | Acosta |
| 2015/0376558 A1 | 12/2015 | Elend et al. |
| 2018/0080011 A1 | 3/2018 | Binder et al. |
| 2018/0092950 A1 | 4/2018 | Davis |
| 2018/0279616 A1 | 10/2018 | Dahmen |
| 2018/0325936 A1 | 11/2018 | Marquardt |
| 2019/0029296 A1 | 1/2019 | Urban |
| 2019/0293527 A1 | 9/2019 | Jabour |
| 2020/0029575 A1 | 1/2020 | Trail |
| 2020/0236965 A1 | 7/2020 | Bianchini |
| 2020/0308613 A1 | 10/2020 | Louie |

FOREIGN PATENT DOCUMENTS

| | | |
|---|---|---|
| EP | 3215609 B1 | 4/2020 |
| WO | WO 2011100165 | 8/2011 |
| WO | WO 2013086548 | 6/2013 |
| WO | WO 2017044624 | 3/2017 |
| WO | WO 2018113743 A1 | 6/2018 |
| WO | WO 2019034567 A1 | 2/2019 |
| WO | WO 2019046954 A1 | 3/2019 |
| WO | WO 2019162362 A1 | 8/2019 |
| WO | WO 2020025580 A1 | 2/2020 |
| WO | WO 2020178184 | 9/2020 |

OTHER PUBLICATIONS

Carere, J. et al. Microb. Biotechnol. 11: 1106-1111 (Year: 2018).*
Carere, J. et al. Frontiers in Microbiol. 9: 1-9 (Year: 2018).*
Ito, M. et al. (Bacterial Cytochrome P450 System Catabolizing the Fusarium Toxin Deoxynivalenol. Appl. Environ. Microbiol. 79: 1619-1628 (Year: 2013).*
Carere (2018) "The identification of DepB: an enzyme responsible for the final detoxification step in the deoxynivalenol epimerization pathway in devosia mutans 17-2-E-8" Frontiers in Microbiology 9(1573):1-9.
Hassan et al. (2017) "The enzymatic epimerization of deoxynivalenol by Devosia mutans proceeds through the formation of 3-keto-DON intermediate" Scientific Reports 7:6929.
He et al. (2010) "Chemical and biological transformations for detoxification of trichothecene mycotoxins in human and animal food chains: a review" Trends in Food Science & Technology 21:67-76.
Ito et al. (2013) "Bacterial cytochrome P450 system catabolizing the fusarium toxin deoxynivalenol" Applied and Environmental Microbiology 79(5):1619-1628.
Juodeikiene et al. (2009) "Reduction of deoxynivalenol (DON) using xylanolytic enzymes during alcoholic fermentation of fusarium contaminated wheat" Original Scientific Paper 13(2):107-110.
Karlovsky (2011) "Biological detoxification of the mycotoxin deoxynivalenol and its use in generically engineered crops and feed additives" Appl Microbiol Biotechnol. 91:491-504.
Loi et al. (2017) "Mycotoxin Biotransformation by Native and Commercial Enzymes: Present and Future Perspectives" Toxins 9:111 (31 pages).
Moerck et al. (1980) "Aflatoxin Destruction in Corn Using Sodium Bisulfite, Soium Hydroxide and Aqueous Ammonia" Journal of Food Protection 43(7):571-574.
Roembke (2019) "Climate change and animal feed: mycotoxin risk mitigation" Feed Strategy Nov. Edition pp. 4-7.
Young et al. (1986) "Reduction in Levels of Deoxynivalenol in Contaminated Corn by Chemical and Physical Treatment" Journal of Agricultural and Food Chemistry 34:465-467.
Young et al. (1986) "Reduction in Levels of Deoxynivalenol in Contaminated Wheat by Chemical and Physical Treatment" Journal of Agricultural and Food Chemistry 34:461-465.
Young et al. (1987) "Detoxification of Deoxynivalenol with Sodium Bisulfite and Evaluation of the Effects when Pure Mycotoxin or Contaminated Corn was Treated and Given to Pigs" J. Agric. Food Chem. 35(2):259-261.
Yu et al. (2010) "Isolation of deoxynivalenol-transforming bacteria from the chicken intestines using the approach of PCR-DGGE guided microbial selection" BMC Microbiol. 10:182-191.

* cited by examiner

Figure 1

| Source of Enzymatic System | % of Control Final Ethanol Titer | % DON Mitigated by System |
|---|---|---|
| Average Control | 100% | 0 |
| Average *P. pastoris* Lysate | 99.6% | 94% |
| Average *P. pastoris* Purified Enzyme | 100% | 94% |
| Average *S. cerevisiae* Lysate | 100.4% | 99% |
| Average *S. cerevisiae* Purified Enzyme | 100.5% | 99% |
| Average *E. coli* Lysate | 100.3% | 96% |
| Average *E. coli* Purified Enzyme | 99.6% | 93% |

SEQUENCE LISTING

```
<160> NUMBER OF SEQ ID NOS: 10

<210> SEQ ID NO 1
<211> LENGTH: 1296
<212> TYPE: DNA
<213> ORGANISM: Artificial Sequence
<220> FEATURE:
<223> OTHER INFORMATION: Synthetic

<400> SEQUENCE: 1
atggttgaag cattgacaat tgatagagtt ccagatcata ttgctagagc agttgttgat      60
ccacatgctt atgcagaatg ggatggttta catgctatgt tggcagaatt aagaagagaa     120
catccatttg ctagagcaga tttggaaggt tacgatccat tttgggttgc ttctaaacat     180
```

```
gcagatattc aagaagtttg tagaagacat gatttgtacc aaaacggtac ttacttcatc    240
ggtacaagaa aggttttgga attagaatat tcaactggta agcatctca agaaagagtt    300 attcaagcta tgaatgcacc agaacacatg aaatacagaa gattaactca aggttggttc    360
caacctaaaa atttgagaaa attggatgaa agattcagaa gaatcgcaag aggttatgtt    420
gatcaaatgg ttgaattggg tggtgaatgt gaattttttcc atgctattgg tgttagatac    480
ccattgttag ttattatgtc aatcttgggt ttgccagatg atgctgaagc ctttatgatg    540
agattgactc aaaacgttac aaacatggat gatgctgaat tgacaggttt accagctcca    600
aaaactgcag aagaaagagc acaaagatca ttagcaatgt ctaacgaagc tagagtttac    660
ttcgatgaat tgtcaagagc tagaagagca tctccaactg atgatgtttc aacattgatc    720
gctaacgcaa caatcgaagg taaaccaatt tctgaaccag atattttggg ttactacatg    780
actgttgcta ttgcaggtca tgatactaca tctgcatcat tgtctggtgc tatttgggct    840
ttagcagaaa gaccagctga attggcaaaa gttaaggcag atttgtcatt aatcccaaat    900
ttggttgaag aagctgttag atggactaca ccaattactc atttcttgag aacagcagtt    960
agagatactg tttttagagg tcaaccaatt gctaagggtg actacgtttt gttgtcatac   1020
acttctggta acagagatga agaagttttc gatgatccat tcgagtttaa agttggtaga   1080
aagaaaaatg aacaagttgc attcggttat ggtccacatg tttgtttggg tcaacatttg   1140
gctagaatgg aaatgaacat tttctttgaa gaattgttgc aagattgaa atctttggaa   1200 ttagctggta caccacaaag aaagatcact tcttcaatgg gtggtccaaa atctgttcca   1260
attagatacc aaatgtcaca tcatcatcat catcat                            1296

<210> SEQ ID NO 2
<211> LENGTH: 333
<212> TYPE: DNA
<213> ORGANISM: Artificial Sequence
<220> FEATURE:
<223> OTHER INFORMATION: Synthetic

<400> SEQUENCE: 2
atggctaaat tgaatgttgt tactagagaa ggtcaagaag ttgttttgga aggtgaagaa     60
ggtttgtctg ttatggaaat catcagagat ggtggtatcg atgaattgtt agctttgtgt    120
ggtggttgtt gttcttgtgc aacatgtcat gttcatgttg atccagcttt tgcagataaa    180
ttaccaccaa tttcagaaga tgaaaacgat ttgttagatt cttcagatca tagaaacgat    240
caatcaagat tgtcatgtca attgactttt tcagctgaat tggatggttt aagagttaca    300
attgcaccag aagatcatca tcatcatcat cat                                333

<210> SEQ ID NO 3
<211> LENGTH: 1245
<212> TYPE: DNA
<213> ORGANISM: Artificial Sequence
<220> FEATURE:
<223> OTHER INFORMATION: Synthetic

<400> SEQUENCE: 3
atggatcatt acgatgtttt tgatcgttgg tgctggtcatg tggtgcaca agctgcagtt    60 tcttttaagac aattgaactt cgaaggttca atcggtttgt taggtgacga agctgatcca    120
ccatacgaaa gaccaccatt gtctaaggaa tacttctcag gtgaaaagac tttcgaaaga    180
attttgatca gaccagcttc ttttttggggt gacagaaacg tttcattgtt attgaacaga    240
```

```
agagttactg ctgttgatgt ccaggtcat  agagttacat tagcagatgg ttcttcatta     300
tcttacggta aattgatttg ggctactggt ggtgcaccaa gaagattatc atgtgttggt     360
ggtgacttga aggtgttcca tggtgttaga acaagagttg atgcagatgc tatgttgtct     420
gaaatcgaat cagttgaaca agttgttgtt attggtggtg ttatattgg tttagaagct      480 gcagctgttt tgtctaagtt cggtaaacat gttactgttt tggaagcatt ggatagagtt     540
ttagcaagag ttgctggtga accattgtca agattctacg aaaacgaaca tagagcacat     600
ggtgttgatg ttagattgaa tgcaatggtt actgaaattg agggtaaaga tggtcatgtt     660
tctggtgtta aattgggtga cggtacaatt ttgccagctc aaatggttat tgtcggtatc     720
ggtatcattc cagctgttga accattaatt gcagctggtg cagttggttc taatggtgtt     780
gatgttgatg aacattgtca acatcattg ccagatatat atgctattgg tgactgtgca      840
gctcatgtta atggttttgc agctgatgct agaattgat  tagaatctgt tcaaaacgca     900
aacgatcaag caactacagc tgttaaagca attgttggtc aaccacaacc atatcatgct    960
gttccttggt tttggtctaa tcaatacgat ttgagattgc aaactgttgg tttgtcaaca    1020
ggttttgatg aagttgttca agaggtgac ccagcagcta gatcattttc tatcgtttat     1080
ttgagaaatg gtaaagttat tgctttggat tgtgttaacg cagttaagga ttacgttcaa    1140
ggtagagctt tagttactgg tggtattgca ccagctaaag atgcattggc taacccagaa    1200
atcccattga agacattggt tccagcacat catcatcatc atcat                    1245
```

<210> SEQ ID NO 4
<211> LENGTH: 2710
<212> TYPE: DNA
<213> ORGANISM: Artificial Sequence
<220> FEATURE:
<223> OTHER INFORMATION: Synthetic

<400> SEQUENCE: 4

```
tcgcgcgttt cggtgatgac ggtgaaaacc tctgacacat gcagctcccg gagacggtca      60
cagcttgtct gtaagcggat gccggagca  gacaagcccg tcagggcgcg tcagcgggtg     120
ttggcgggtg tcgggctgg  cttaactatg cggcatcaga gcagattgta ctgagagtgc     180
accatatgcg gtgtgaaata ccgcacagat gcgtaaggag aaaataccgc atcaggcgcc     240
attcgccatt caggctgcgc aactgttggg aagggcgatc ggtgcgggcc tcttcgctat     300
tacgccagct ggcgaaaggg ggatgtgctg caaggcgatt aagttgggta acgccagggt     360
tttcccagtc acgacgttgt aaaacgacgg ccagtgaatt cgagctcggt acctcgcgaa     420
tgcatctaga tatcggatcc cgggcccgtc gactgcagag gcctgcatgc aagcttggcg     480
taatcatggt catagctgtt tcctgtgtga attgttatc  cgctcacaat tccacacaac     540
atacgagccg aagcataaa  gtgtaaagcc tggggtgcct aatgagtgag ctaactcaca     600
ttaattgcgt tgcgctcact gcccgctttc cagtcgggaa acctgtcgtg ccagctgcat     660
taatgaatcg gccaacgcgc ggggagaggc ggtttgcgta ttgggcgctc ttccgcttcc     720
tcgctcactg actcgctgcg ctcggtcgtt cggctgcggc gagcggtatc agctcactca     780
aaggcggtaa tacggttatc cacagaatca ggggataacg caggaaagaa catgtgagca    840
aaaggccagc aaaaggccag gaaccgtaaa aaggccgcgt tgctggcgtt tttccatagg    900
ctccgccccc ctgacgagca tcacaaaaat cgacgctcaa gtcagaggtg cgaaacccg     960 acaggactat aaagatacca ggcgtttccc cctggaagct ccctcgtgcg ctctcctgtt    1020
ccgaccctgc cgcttaccgg atacctgtcc gcctttctcc cttcgggaag cgtggcgctt    1080
```

```
tctcatagct cacgctgtag gtatctcagt tcggtgtagg tcgttcgctc caagctgggc    1140
tgtgtgcacg aaccccccgt tcagcccgac cgctgcgcct tatccggtaa ctatcgtctt    1200
gagtccaacc cggtaagaca cgacttatcg ccactggcag cagccactgg taacaggatt    1260
agcagagcga ggtatgtagg cggtgctaca gagttcttga agtggtggcc taactacggc    1320
tacactagaa gaacagtatt tggtatctgc gctctgctga agccagttac cttcggaaaa    1380
agagttggta gctcttgatc cggcaaacaa accaccgctg gtagcggtgg ttttttttgtt    1440 tgcaagcagc agattacgcg cagaaaaaaa ggatctcaag aagatccttt gatcttttct    1500
acggggtctg acgctcagtg gaacgaaaac tcacgttaag gattttggt catgagatta     1560 tcaaaaagga tcttcaccta gatccttta aattaaaaat gaagttttaa atcaatctaa     1620
agtatatatg agtaaacttg gtctgacagt taccaatgct taatcagtga ggcacctatc    1680
tcagcgatct gtctatttcg ttcatccata gttgcctgac tccccgtcgt gtagataact    1740
acgatacggg agggcttacc atctggcccc agtgctgcaa tgataccgcg agacccacgc    1800
tcaccggctc cagatttatc agcaataaac cagccagccg aagggccga gcgcagaagt      1860 ggtcctgcaa ctttatccgc ctccatccag tctattaatt gttgccggga agctagagta    1920
agtagttcgc cagttaatag tttgcgcaac gttgttgcca ttgctacagg catcgtggtg    1980
tcacgctcgt cgtttggtat ggcttcattc agctccggtt cccaacgatc aaggcgagtt    2040
acatgatccc ccatgttgtg caaaaaagcg gttagctcct tcggtcctcc gatcgttgtc    2100
agaagtaagt tggccgcagt gttatcactc atggttatgg cagcactgca taattctctt    2160
actgtcatgc catccgtaag atgcttttct gtgactggtg agtactcaac caagtcattc    2220
tgagaatagt gtatgcggcg accgagttgc tcttgcccgg cgtcaatacg ggataatacc    2280
gcgccacata gcagaacttt aaaagtgctc atcattggaa aacgttcttc ggggcgaaaa    2340
ctctcaagga tcttaccgct gttgagatcc agttcgatgt aacccactcg tgcacccaac    2400
tgatcttcag catcttttac tttcaccagc gtttctgggt gagcaaaaac aggaaggcaa    2460
aatgccgcaa aaaagggaat aagggcgaca cggaaatgtt gaatactcat actcttcctt    2520
tttcaatatt attgaagcat ttatcagggt tattgtctca tgagcggata catatttgaa    2580
tgtatttaga aaaataaaca aataggggtt ccgcgcacat ttccccgaaa agtgccacct    2640
gacgtctaag aaaccattat tatcatgaca ttaacctata aaaataggcg tatcacgagg    2700
cccttcgtc                                                            2710
```

<210> SEQ ID NO 5
<211> LENGTH: 7667
<212> TYPE: DNA
<213> ORGANISM: Artificial Sequence
<220> FEATURE:
<223> OTHER INFORMATION: Synthetic

<400> SEQUENCE: 5

```
agatctaaca tccaaagacg aaaggttgaa tgaaaccttt ttgccatccg acatccacag     60
gtccattctc acacataagt gccaaacgca acaggagggg atacactagc agcagaccgt    120
tgcaaacgca ggacctccac tcctcttctc ctcaacaccc actttgcca tcgaaaaacc     180 agcccagtta ttgggcttga ttggagctcg ctcattccaa ttccttctat taggctacta    240
acaccatgac tttattagcc tgtctatcct ggcccctg gcgaggttca tgtttgttta      300
tttccgaatg caacaagctc cgcattacac ccgaacatca ctccagatga gggctttctg    360
```

```
agtgtggggt caaatagttt catgttcccc aaatggccca aaactgacag tttaaacgct      420
gtcttggaac ctaatatgac aaaagcgtga tctcatccaa gatgaactaa gtttggttcg      480
ttgaaatgct aacggccagt tggtcaaaaa gaaacttcca aaagtcggca taccgtttgt      540
cttgtttggt attgattgac gaatgctcaa aaataatctc attaatgctt agcgcagtct      600
ctctatcgct tctgaacccc ggtgcacctg tgccgaaacg caaatgggga acacccgct      660 ttttggatga ttatgcattg tctccacatt gtatgcttcc aagattctgg tgggaatact      720
gctgatagcc taacgttcat gatcaaaatt taactgttct aacccctact tgacagcaat      780
atataaacag aaggaagctg ccctgtctta aaccttttt tttatcatca ttattagctt      840
actttcataa ttgcgactgg ttccaattga caagcttttg atttttaacga cttttaacga      900 caacttgaga agatcaaaaa acaactaatt attcgaaacg gaattccgga ccggcatgcc      960
aaggcctcag gtaccggccg gccatttaaa tacaggcccc ttttcctttg tcgatatcat     1020
gtaattagtt atgtcacgct tacattcacg ccctcctccc acatccgctc taaccgaaaa     1080
ggaaggagtt agacaacctg aagtctaggt ccctatttat tttttttaat agttatgtta     1140
gtattaagaa cgttatttat atttcaaatt tttctttttt ttctgtacaa acgcgtgtac     1200
gcatgtaaca ttatactgaa aaccttgctt gagaaggttt tgggacgctc gaaggcttta     1260
atttgcaagc tggatccgcg gccgccttcc aaactctcat ggattctcag gtaataggta     1320
ttctaggagg aggccagcta ggccgaatga ttgttgaggc cgctagcagg ctcaatatca     1380
agaccgtgat tcttgatgat ggttttttcac ctgctaagca cattaatgct gcgcaagacc     1440
acatcgacgg atcattcaaa gatgaggagg ctatcgccaa gttagctgcc aaatgtgatg     1500
ttctcactgt agagattgag catgtcaaca cagatgctct aaagagagtt caagacagaa     1560
ctggaatcaa gatatatcct ttaccagaga caatcgaact aatcaaggat aagtacttgc     1620
aaaaggaaca tttgatcaag cacaacattt cggtgacaaa gtctcagggt atagaatcta     1680
atgaaaaggc gctgcttttg tttggagaag agaatggatt tccatatctg ttgaagtccc     1740
ggactatggc ttatgatgga agaggcaatt ttgtagtgga gtctaaagag gacatcagta     1800
aggcattaga gttcttgaaa gatcgtccat tgtatgccga agtttgct cctttgtta     1860 aagaattagc ggtaatggtt gtgagatcac tggaaggcga agtattctcc tacccaaccg     1920
tagaaactgt gcacaaggac aatatctgtc atattgtgta tgctccggcc agagttaatg     1980
acaccatcca aagaaagct caaatattag ctgaaaacac tgtgaagact ttcccaggcg     2040
ctggaatctt cggagttgag atgttcctat tgtctgatgg agaacttctt gtaaatgaga     2100
ttgctccaag gccccacaat tctggtcact atacaatcga tgcatgtgta acatctcagt     2160
tcgaagcaca tgtaagagcc ataactggtc tgccaatgcc actagatttc accaaactat     2220
ctacttccaa caccaacgct attatgctca atgttttggg tgctgaaaaa tctcacgggg     2280
aattagagtt ttgtagaaga gccttagaaa cacccggtgc ttctgtatat ctgtacggaa     2340
agaccacccg attggctcgt aagatgggtc atatcaacat aataggatct tccatgttgg     2400
aagcagaaca aaagttagag tacattctag aagaatcaac ccacttacca tccagtactg     2460
tatcagctga cactaaaccg ttggttggag ttatcatggg ttcagactct gatctacctg     2520
tgatttcgaa aggttgcgat attttaaaac agtttggtgt tccattcgaa gttactattg     2580
tctctgctca tagaacacca cagagaatga ccagatatgc ctttgaagcc gctagtagag     2640
gtatcaaggc tatcattgca ggtgctggtg gtgctgctca tcttccagga atggttgctg     2700
ccatgactcc gttgccagtc attggtgttc ctgtcaaggg ctctacgttg gatggtgtag     2760
```

```
actcgctaca ctcgattgtc caaatgccta gaggtgttcc tgtggctacg gttgctatca    2820
acaacgccac caatgccgct ctgttggcca tcaggatttt aggtacaatt gaccacaaat    2880
ggcaaaagga aatgtccaag tatatgaatg caatggagac cgaagtgttg gggaaggcat    2940
ccaacttgga atctgaaggg tatgaatcct atttgaagaa tcgtctttga atttagtatt    3000
gttttttaat agatgtatat ataatagtac acgtaactta tctattccat tcataatttt    3060
attttaaagg ttcggtagaa atttgtcctc caaaaagttg gttagagcct ggcagttttg    3120
ataggcatta ttatagattg ggtaatattt accctgcacc tggaggaact ttgcaaagag    3180
cctcatgtgc ggcgcgccag gccataatgg ccaaacggtt tctcaattac tatatactac    3240
taaccattta cctgtagcgt atttctttc cctcttcgcg aaagctcaag ggcatcttct      3300
tgactcatga aaaatatctg gatttcttct gacagatcat caccccttgag cccaactctc    3360 tagcctatga gtgtaagtga tagtcatctt gcaacagatt attttggaac gcaactaaca    3420
aagcagatac acccttcagc agaatccttt ctggatattg tgaagaatga tcgccaaagt    3480
cacagtcctg agacagttcc taatctttac cccatttaca agttcatcca atcagacttc    3540
ttaacgcctc atctggctta tatcaagctt accaacagtt cagaaactcc cagtccaagt    3600
ttcttgcttg aaagtgcgaa gaatggtgac accgttgaca ggtacacctt tatgggacat    3660
tcccccagaa aaataatcaa gactgggcct ttagagggtg ctgaagttga ccccttggtg    3720
cttctggaaa aagaactgaa gggcaccaga caagcgcaac ttcctggtat tcctcgtcta    3780
agtggtggtg ccataggata catctcgtac gattgtatta agtactttga accaaaaact    3840
gaaagaaaac tgaaagatgt tttgcaactt ccggaagcag ctttgatgtt gttcgacacg    3900
atcgtggctt ttgacaatgt ttatcaaaga ttccaggtaa ttggaaacgt ttctctatcc    3960
gttgatgact cggacgaagc tattcttgag aaatattata agacaagaga agaagtggaa    4020
aagatcagta aagtggtatt tgacaataaa actgttccct actatgaaca aaagatatt      4080 attcaaggcc aaacgttcac ctctaatatt ggtcaggaag ggtatgaaaa ccatgttcgc    4140
aagctgaaag aacatattct gaaaggagac atcttccaag ctgttccctc tcaaagggta    4200
gccaggccga cctcattgca ccctttcaac atctatcgtc atttgagaac tgtcaatcct    4260
tctccataca tgttctatat tgactatcta gacttccaag ttgttggtgc ttcacctgaa    4320
ttactagtta aatccgacaa caacaacaaa atcatcacac atcctattgc tggaactctt    4380
cccagaggta aaactatcga agaggacgac aattatgcta agcaattgaa gtcgtctttg    4440
aaagacaggg ccgagcacgt catgctggta gatttggcca gaaatgatat taccgtgtg     4500 tgtgagccca ccagtaccac ggttgatcgt ttattgactg tggagagatt ttctcatgtg    4560
atgcatcttg tgtcagaagt cagtggaaca ttgagaccaa acaagactcg cttcgatgct    4620
ttcagatcca tttcccagc aggaaccgtc tccggtgctc cgaaggtaag agcaatgcaa     4680
ctcataggag aattggaagg agaaaagaga ggtgtttatg cggggggccgt aggacactgg    4740 tcgtacgatg gaaaatcgat ggacacatgt attgccttaa gaacaatggt cgtcaaggac    4800
ggtgtcgctt accttcaagc cggaggtgga attgtctacg attctgaccc ctatgacgag    4860
tacatcgaaa ccatgaacaa aatgagatcc aacaataaca ccatcttgga ggctgagaaa    4920
atctggaccg ataggttggc cagagacgag aatcaaagtg aatccgaaga aaacgatcaa    4980
tgaacggagg acgtaagtag gaatttatgg tttggccata atggcctagc ttggcgtaat    5040
catggtcata gctgtttcct gtgtgaaatt gttatccgct cacaattcca cacaacatac    5100
```

-continued

```
gagccggaag cataaagtgt aaagcctggg gtgcctaatg agtgagctaa ctcacattaa      5160
ttgcgttgcg ctcactgccc gctttccagt cgggaaacct gtcgtgccag ctgcattaat      5220
gaatcggcca acgcgcgggg agaggcggtt tgcgtattgg gcgctcttcc gcttcctcgc      5280
tcactgactc gctgcgctcg tcgttcggc tgcggcgagc ggtatcagct cactcaaagg       5340
cggtaatacg gttatccaca gaatcagggg ataacgcagg aaagaacatg tgagcaaaag      5400
gccagcaaaa ggccaggaac cgtaaaaagg ccgcgttgct ggcgtttttc cataggctcc      5460
gcccccctga cgagcatcac aaaaatcgac gctcaagtca gaggtggcga aacccgacag      5520
gactataaag ataccaggcg tttccccctg gaagctccct cgtgcgctct cctgttccga      5580
ccctgccgct taccggatac ctgtccgcct ttctcccttc gggaagcgtg cgctttctc      5640 atagctcacg ctgtaggtat ctcagttcgg tgtaggtcgt tcgctccaag ctgggctgtg      5700
tgcacgaacc ccccgttcag cccgaccgct gcgccttatc cggtaactat cgtcttgagt      5760
ccaacccggt aagacacgac ttatcgccac tggcagcagc cactggtaac aggattagca      5820
gagcgaggta tgtaggcggt gctacagagt tcttgaagtg gtggcctaac tacggctaca      5880
ctagaaggac agtatttggt atctgcgctc tgctgaagcc agttaccttc ggaaaaagag      5940
ttggtagctc ttgatccggc aaacaaacca ccgctggtag cggtggtttt tttgtttgca      6000
agcagcagat tacgcgcaga aaaaaaggat ctcaagaaga tcctttgatc ttttctacgg      6060
ggtctgacgc tcagtggaac gaaaactcac gttaaggggat tttggtcatg agattatcaa      6120
aaaggatctt cacctagatc cttttaaatt aaaaatgaag ttttaaatca atctaaagta      6180
tatatgagta aacttggtct gacagttacc aatgcttaat cagtgaggca cctatctcag      6240
cgatctgtct atttcgttca tccatagttg cctgactccc cgtcgtgtag ataactacga      6300
tacgggaggg cttaccatct ggccccagtg ctgcaatgat accgcgagac ccacgctcac      6360
cggctccaga tttatcagca ataaaccagc cagccggaag ggccgagcgc agaagtggtc      6420
ctgcaacttt atccgcctcc atccagtcta ttaattgttg ccgggaagct agagtaagta      6480
gttcgccagt taatagtttg cgcaacgttg ttgccattgc tacaggcatc gtggtgtcac      6540
gctcgtcgtt tggtatggct tcattcagct ccggttccca acgatcaagg cgagttacat      6600 gatccccat gttgtgcaaa aaagcggtta gctccttcgg tcctccgatc gttgtcagaa      6660
gtaagttggc cgcagtgtta tcactcatgg ttatggcagc actgcataat tctcttactg      6720
tcatgccatc cgtaagatgc ttttctgtga ctggtgagta ctcaaccaag tcattctgag      6780
aatagtgtat gcggcgaccg agttgctctt gcccggcgtc aatacgggat aataccgcgc      6840
cacatagcag aactttaaaa gtgctcatca ttggaaaacg ttcttcgggg cgaaaactct      6900
caaggatctt accgctgttg agatccagtt cgatgtaacc cactcgtgca cccaactgat      6960
cttcagcatc ttttactttc accagcgttt ctgggtgagc aaaaacagga aggcaaaatg      7020
ccgcaaaaaa gggaataagg gcgacacgga aatgttgaat actcatactc ttcctttttc      7080
aatattattg aagcatttat cagggttatt gtctcatgag cggatacata tttgaatgta      7140
tttagaaaaa taaacaaata ggggttccgc gcacatttcc ccgaaaagtg ccacctgacg      7200
tctaagaaac cattattatc atgacattaa cctataaaaa taggcgtatc acgaggccct      7260
ttcgtctcgc gcgtttcggt gatgacggtg aaaacctctg acacatgcag ctcccggaga      7320
cggtcacagc ttgtctgtaa gcggatgccg ggagcagaca agcccgtcag gcgcgtcag      7380 cgggtgttgg cgggtgtcgg ggctggctta actatgcggc atcagagcag attgtactga      7440
gagtgcacca tatgcggtgt gaaataccgc acagatgcgt aaggagaaaa taccgcatca      7500
```

```
ggcgccattc gccattcagg ctgcgcaact gttgggaagg gcgatcggtg cgggcctctt    7560
cgctattacg ccagctggcg aaaggggat gtgctgcaag gcgattaagt tgggtaacgc     7620
cagggttttc ccagtcacga cgttgtaaaa cgacggccag tgaattg                 7667

<210> SEQ ID NO 6
<211> LENGTH: 7732
<212> TYPE: DNA
<213> ORGANISM: Artificial Sequence
<220> FEATURE:
<223> OTHER INFORMATION: Synthetic

<400> SEQUENCE: 6
agatctaaca tccaaagacg aaaggttgaa tgaaaccttt ttgccatccg acatccacag     60
gtccattctc acacataagt gccaaacgca acaggagggg atacactagc agcagaccgt    120
tgcaaacgca ggacctccac tcctcttctc ctcaacaccc acttttgcca tcgaaaaacc    180
agcccagtta ttgggcttga ttggagctcg ctcattccaa ttccttctat taggctacta    240
acaccatgac tttattagcc tgtctatcct ggcccccctg gcgaggttca tgtttgttta    300
tttccgaatg caacaagctc cgcattacac ccgaacatca ctccagatga gggctttctg    360
agtgtggggt caaatagttt catgttcccc aaatggccca aaactgacag tttaaacgct    420
gtcttggaac ctaatatgac aaaagcgtga tctcatccaa gatgaactaa gtttggttcg    480
ttgaaatgct aacggccagt tggtcaaaaa gaaacttcca aaagtcggca taccgtttgt    540
cttgtttggt attgattgac gaatgctcaa aaataatctc attaatgctt agcgcagtct    600
ctctatcgct tctgaacccc ggtgcacctg tgccgaaacg caaatgggga aacacccgct    660
ttttggatga ttatgcattg tctccacatt gtatgcttcc aagattctgg tgggaatact    720
gctgatagcc taacgttcat gatcaaaatt taactgttct aaccccctact tgacagcaat    780 atataaacag aaggaagctg ccctgtctta aacctttttt tttatcatca ttattagctt    840
actttcataa ttgcgactgg ttccaattga caagcttttg attttaacga cttttaacga    900
caacttgaga agatcaaaaa acaactaatt attcgaaacg gaattccgga ccggcatgca    960
ggcctggtac cggccggcca tttaaataca ggcccctttt cctttgtcga tatcatgtaa   1020
ttagttatgt cacgcttaca ttcacgccct cctcccacat ccgctctaac cgaaaaggaa   1080
ggagttagac aacctgaagt ctaggtccct atttattttt tttaatagtt atgttagtat   1140
taagaacgtt atttatattt caaatttttc ttttttttct gtacaaacgc gtgtacgcat   1200
gtaacattat actgaaaacc ttgcttgaga aggttttggg acgctcgaag ctttaatttt   1260
gcaagctgga tccgcggccg cgacttgact cttcactagc ctatgcaaat aaggttacct   1320
tttccaagaa tcgtagaaac gattaaaaaa cttccaaact ctcatggatt ctcaggtaat   1380
aggtattcta ggaggaggcc agctaggccg aatgattgtt gaggccgcta gcaggctcaa   1440
tatcaagacc gtgattcttg atgatggttt tcacctgct aagcacatta atgctgcgca    1500
agaccacatc gacggatcat tcaaagatga ggaggctatc gccaagttag ctgccaaatg   1560
tgatgttctc actgtagaga ttgagcatgt caacacagat gctctaaaga gagttcaaga   1620
cagaactgga atcaagatat atccttacc agagacaatc gaactaatca aggataagta    1680
cttgcaaaag gaacatttga tcaagcacaa catttcggtg acaaagtctc agggtataga   1740
atctaatgaa aaggcgctgc ttttgtttgg agaagagaat ggatttccat atctgttgaa   1800
gtcccggact atggcttatg atggaagagg caattttgta gtggagtcta agaggacat    1860
```

```
cagtaaggca ttagagttct tgaaagatcg tccattgtat gccgagaagt ttgctccttt     1920
tgttaaagaa ttagcggtaa tggttgtgag atcactggaa ggcgaagtat tctcctaccc     1980
aaccgtagaa actgtgcaca aggacaatat ctgtcatatt gtgtatgctc cggccagagt     2040
taatgacacc atccaaaaga aagctcaaat attagctgaa acactgtga agactttccc     2100 aggcgctgga atcttcggag ttgagatgtt cctattgtct gatggagaac ttcttgtaaa     2160
tgagattgct ccaaggcccc acaattctgg tcactataca atcgatgcat gtgtaacatc     2220
tcagttcgaa gcacatgtaa gagccataac tggtctgcca atgccactag atttcaccaa     2280
actatctact tccaacacca acgctattat gctcaatgtt ttgggtgctg aaaaatctca     2340
cggggaatta gagttttgta gaagagcctt agaaacaccc ggtgcttctg tatatctgta     2400
cggaaagacc acccgattgg ctcgtaagat gggtcatatc aacataatag gatcttccat     2460
gttggaagca gaacaaaagt tagagtacat tctagaagaa tcaacccact taccatccag     2520
tactgtatca gctgacacta aaccgttggt tggagttatc atgggttcag actctgatct     2580
acctgtgatt tcgaaaggtt gcgatatttt aaaacagttt ggtgttccat tcgaagttac     2640
tattgtctct gctcatagaa caccacagag aatgaccaga tatgcctttg aagccgctag     2700
tagaggtatc aaggctatca ttgcaggtgc tggtggtgct gctcatcttc caggaatggt     2760
tgctgccatg actccgttgc cagtcattgg tgttcctgtc aagggctcta cgttggatgg     2820
tgtagactcg ctacactcga ttgtccaaat gcctagaggt gttcctgtgg ctacggttgc     2880
tatcaacaac gccaccaatg ccgctctgtt ggccatcagg attttaggta caattgacca     2940
caaatggcaa aaggaaatgt ccaagtatat gaatgcaatg gagaccgaag tgttggggaa     3000
ggcatccaac ttggaatctg aagggtatga atcctatttg aagaatcgtc tttgaattta     3060
gtattgtttt ttaatagatg tatatataat agtacacgta acttatctat tccattcata     3120
attttatttt aaaggttcgg tagaaatttg tcctccaaaa agttggttag agcctggcag     3180
ttttgatagg cattattata gattgggtaa tatttacccct gcacctggag gaactttgca     3240
aagagcctca tgtgcggcgc gccaggccat aatggccaaa cggtttctca attactatat     3300
actactaacc atttacctgt agcgtatttc ttttcccctct tcgcgaaagc tcaagggcat     3360
cttcttgact catgaaaaat atctggattt cttctgacag atcatcaccc ttgagcccaa     3420
ctctctagcc tatgagtgta agtgatagtc atcttgcaac agattatttt ggaacgcaac     3480
taacaaagca gatacaccct tcagcagaat cctttctgga tattgtgaag aatgatcgcc     3540
aaagtcacag tcctgagaca gttcctaatc tttaccccat ttacaagttc atccaatcag     3600
acttcttaac gcctcatctg cttatatca agcttaccaa cagttcagaa actcccagtc     3660
caagtttctt gcttgaaagt gcgaagaatg gtgacaccgt tgacaggtac acctttatgg     3720
gacattcccc cagaaaaata atcaagactg ggcctttaga gggtgctgaa gttgacccct     3780
tggtgcttct ggaaaaagaa ctgaagggca ccagacaagc gcaacttcct ggtattcctc     3840
gtctaagtgg tggtgccata ggatacatct cgtacgattg tattaagtac tttgaaccaa     3900
aaactgaaag aaaactgaaa gatgttttgc aacttccgga agcagctttg atgttgttcg     3960
acacgatcgt ggcttttgac aatgtttatc aaagattcca ggtaattgga aacgtttctc     4020
tatccgttga tgactcggac gaagctattc ttgagaaata ttataagaca agagaagaag     4080
tggaaaagat cagtaaagtg gtatttgaca ataaaactgt tccctactat gaacagaaag     4140
atattattca aggccaaacg ttcacctcta atattggtca ggaagggtat gaaaaccatg     4200
ttcgcaagct gaaagaacat attctgaaag gagacatctt ccaagctgtt ccctctcaaa     4260
```

```
gggtagccag gccgacctca ttgcaccctt tcaacatcta tcgtcatttg agaactgtca    4320
atccttctcc atacatgttc tatattgact atctagactt ccaagttgtt ggtgcttcac    4380
ctgaattact agttaaatcc gacaacaaca acaaaatcat cacacatcct attgctggaa    4440
ctcttcccag aggtaaaact atcgaagagg acgacaatta tgctaagcaa ttgaagtcgt    4500
ctttgaaaga cagggccgag cacgtcatgc tggtagattt ggccagaaat gatattaacc    4560
gtgtgtgtga gcccaccagt accacggttg atcgtttatt gactgtggag aгaттттctc    4620 atgtgatgca tcttgtgtca gaagtcagtg gaacattgag accaaacaag actcgcttcg    4680
atgctttcag atccattttc ccagcaggaa ccgtctccgg tgctccgaag gtaagagcaa    4740

tgcaactcat aggagaattg aaggagaaa agagaggtgt tatgcgggg gccgtaggac    4800 actggtcgta cgatggaaaa tcgatggaca catgtattgc cttaagaaca atggtcgtca    4860
aggacggtgt cgcttacctt caagccggag gtggaattgt ctacgattct gacccctatg    4920
acgagtacat cgaaaccatg aacaaaatga gatccaacaa taacaccatc ttggaggctg    4980
agaaaatctg gaccgatagg ttggccagag acgagaatca agtgaatcc gaagaaaacg    5040 atcaatgaac ggaggacgta agtaggaatt tatggttt gg ccataatggc ctagcttggc    5100
gtaatcatgg tcatagctgt ttcctgtgtg aaattgtt at ccgctcacaa tccacacaa    5160 catacgagcc ggaagcatтaa agtgtaaagc ctggggtgcc taatgagtga gctaactcac    5220
attaattgcg ttgcgctcac tgcccgcttt ccagtcggga aacctgtcgt gccagctgca    5280

ttaatgaatc ggccaacgcg cggggagagg cggtttgcgt attgggcgct cttccgcttc    5340
ctcgctcact gactcgctgc gctcggtcgt tcggctgcgg cgagcggtat cagctcactc    5400
aaaggcggta atacggttat ccacagaatc aggggataac gcaggaaaga acatgtgagc    5460
aaaaggccag caaaaggcca ggaaccgtaa aaaggccgcg ttgctggcgt ttttccatag    5520
gctccgcccc cctgacgagc atcacaaaaa tcgacgctca agtcagaggt ggcgaaaccc    5580
gacaggacta taaagataat ccagcgttt cc ccctggaagc tccctcgtgc gctctcctgt    5640

tccgaccctg ccgcttaccg gatacctgtc cgccttttct ccttcgggaa gcgtggcgct    5700

ttctcatagc tcacgctgta ggtatctcag ttcggtgtag tcgttcgct ccaagctggg    5760 ctgtgtgcac gaaccccccg ttcagcccga ccgctgcgcc ttatccggta actatcgtct    5820

tgagtccaac ccggtaagac acgacttatc gccactggca gcagccactg gtaacaggat    5880

tagcagagcg aggtatgtag gcggtgctac agagttcttg aagtggtggc ctaactacgg    5940
ctacactaga aggacagtat ttggtatctg cgctctgctg aagccagtta ccttcggaaa    6000
aagagttggt agctcttgat ccggcaaaca aaccaccgct ggtagcggtg ttttttgt    6060

ttgcaagcag cagattacgc gcagaaaaaa aggatctcaa gaagatcctt tgatcttttc    6120

tacggggtct gacgctcagt ggaacgaaaa ctcacgttaa gggattttgg tcatgagatt    6180

atcaaaaagg atcttcacct agaтccттттт aaattaaaaa tgaagtttta atcaatcta    6240 aagtatatat gagtaaactt ggtctgacag ttaccaatgc ttaatcagtg aggcacctat    6300
ctcagcgatc tgtctatttc gttcatccat agttgcctga ctccccgtcg tgtagataac    6360

tacgatacga gagggcttac catctggccc cagtgctgca atgataccgc gagacccacg    6420
ctcaccggct ccagatttat cagcaataaa ccagccagcc ggaagggccg agcgcagaag    6480

tggtcctgca actttatccg cctccatcca gtctattaat tgttccggg aagctagagt    6540 aagtagttcg ccagttaata gттгgcgcaa cgttgttgcc attgctacag gcatcgtggt    6600
```

```
gtcacgctcg tcgtttggta tggcttcatt cagctccggt tcccaacgat caaggcgagt    6660
tacatgatcc cccatgttgt gcaaaaaagc ggttagctcc ttcggtcctc cgatcgttgt    6720
cagaagtaag ttggccgcag tgttatcact catggttatg gcagcactgc ataattctct    6780
tactgtcatg ccatccgtaa gatgcttttc tgtgactggt gagtactcaa ccaagtcatt    6840
ctgagaatag tgtatgcggc gaccgagttg ctcttgcccg gcgtcaatac gggataatac    6900
cgcgccacat agcagaactt taaaagtgct catcattgga aaacgttctt cggggcgaaa    6960
actctcaagg atcttaccgc tgttgagatc cagttcgatg taacccactc gtgcacccaa    7020
ctgatcttca gcatctttta ctttcaccag cgtttctggg tgagcaaaaa caggaaggca    7080
aaatgccgca aaaagggaa taagggcgac acggaaatgt tgaatactca tactcttcct    7140
ttttcaatat tattgaagca tttatcaggg ttattgtctc atgagcggat acatatttga    7200
atgtatttag aaaaataaac aaatagggt ccgcgcaca tttccccgaa aagtgccacc    7260
tgacgtctaa gaaaccatta ttatcatgac attaacctat aaaaataggc gtatcacgag    7320 gcccttcgt ctcgcgcgtt tcggtgatga cggtgaaaac ctctgacaca tgcagctccc    7380
ggagacggtc acagcttgtc tgtaagcgga tgccgggagc agacaagccc gtcagggcgc    7440
gtcagcgggt gttggcgggt gtcggggctg gcttaactat gcggcatcag agcagattgt    7500
actgagagtg caccatatgc ggtgtgaaat accgcacaga tgcgtaagga gaaaataccg    7560
catcaggcgc cattcgccat tcaggctgcg caactgttgg gaagggcgat cggtgcgggc    7620
ctcttcgcta ttacgccagc tggcgaaagg gggatgtgct gcaaggcgat taagttgggt    7680
aacgccaggg ttttcccagt cacgacgttg taaaacgacg gccagtgaat tg           7732

<210> SEQ ID NO 7
<211> LENGTH: 7898
<212> TYPE: DNA
<213> ORGANISM: Artificial Sequence
<220> FEATURE:
<223> OTHER INFORMATION: Synthetic

<400> SEQUENCE: 7
agatctaaca tccaaagacg aaaggttgaa tgaaaccttt ttgccatccg acatccacag      60
gtccattctc acacataagt gccaaacgca acaggagggg atacactagc agcagaccgt     120
tgcaaacgca ggacctccac tcctcttctc ctcaacaccc acttttgcca tcgaaaaacc     180
agcccagtta ttgggcttga ttggagctcg ctcattccaa ttccttctat taggctacta     240
acaccatgac tttattagcc tgtctatcct ggccccctg gcgaggttca tgtttgttta     300
tttccgaatg caacaagctc cgcattacac ccgaacatca ctccagatga gggctttctg     360
agtgtggggt caaatagttt catgttcccc aaatggccca aaactgacag tttaaacgct     420
gtcttggaac ctaatatgac aaaagcgtga tctcatccaa gatgaactaa gtttggttcg     480
ttgaaatgct aacggccagt tggtcaaaaa gaaacttcca aaagtcggca taccgtttgt     540
cttgtttggt attgattgac gaatgctcaa aaataatctc attaatgctt agcgcagtct     600
ctctatcgct tctgaacccc ggtgcacctg tgccgaaacg caaatgggga acacccgct      660 ttttggatga ttatgcattg tctccacatt gtatgcttcc aagattctgg tgggaatact     720
gctgatagcc taacgttcat gatcaaaatt taactgttct aacccctact tgacagcaat     780
atataaacag aaggaagctg ccctgtctta aacctttttt tttatcatca ttattagctt     840
actttcataa ttgcgactgg ttccaattga caagcttttg attttaacga cttttaacga     900
caacttgaga agatcaaaaa acaactaatt attcgaaacg atgagatttc cttcaatttt     960
```

```
tactgctgtt ttattcgcag catcctccgc attagctgct ccagtcaaca ctacaacaga    1020
agatgaaacg gcacaaattc cggctgaagc tgtcatcggt tactcagatt tagaagggga    1080
tttcgatgtt gctgttttgc cattttccaa cagcacaaat aacgggttat tgtttataaa    1140
tactactatt gccagcattg ctgctaaaga agaaggggta tctctcgaga aaaggcctca    1200
ggtaccggcc ggccatttaa atacaggccc cttttccttt gtcgatatca tgtaattagt    1260
tatgtcacgc ttacattcac gccctcctcc cacatccgct ctaaccgaaa aggaaggagt    1320
tagacaacct gaagtctagg tccctattta ttttttttaa tagttatgtt agtattaaga    1380
acgttattta tatttcaaat ttttcttttt tttctgtaca aacgcgtgta cgcatgtaac    1440
attatactga aaaccttgct tgagaaggtt ttgggacgct cgaaggcttt aatttgcaag    1500
ctggatccgc ggccgccttc caaactctca tggattctca ggtaataggt attctaggag    1560
gaggccagct aggccgaatg attgttgagg ccgctagcag gctcaatatc aagaccgtga    1620
ttcttgatga tggttttttca cctgctaagc acattaatgc tgcgcaagac cacatcgacg    1680
gatcattcaa agatgaggag gctatcgcca agttagctgc caaatgtgat gttctcactg    1740
tagagattga gcatgtcaac acagatgctc taaagagagt tcaagacaga actggaatca    1800
agatatatcc tttaccagag acaatcgaac taatcaagga taagtacttg caaaaggaac    1860
atttgatcaa gcacaacatt tcggtgacaa agtctcaggg tatagaatct aatgaaaagg    1920
cgctgctttt gtttggagaa gagaatggat ttccatatct gttgaagtcc cggactatgg    1980
cttatgatgg aagaggcaat tttgtagtgg agtctaaaga ggacatcagt aaggcattag    2040
agttcttgaa agatcgtcca ttgtatgccg agaagtttgc tccttttgtt aaagaattag    2100
cggtaatggt tgtgagatca ctggaaggcg aagtattctc ctacccaacc gtagaaactg    2160
tgcacaagga caatatctgt catattgtgt atgctccggc cagagttaat gacaccatcc    2220
aaaagaaagc tcaaatatta gctgaaaaca ctgtgaagac tttcccaggc gctggaatct    2280
tcggagttga gatgttccta ttgtctgatg gagaacttct tgtaaatgag attgctccaa    2340
ggccccacaa ttctggtcac tatacaatcg atgcatgtgt aacatctcag ttcgaagcac    2400
atgtaagagc cataactggt ctgccaatgc cactagattt caccaaacta tctacttcca    2460
acaccaacgc tattatgctc aatgtttttgg gtgctgaaaa atctcacggg gaattagagt    2520
tttgtagaag agccttagaa acacccggtg cttctgtata tctgtacgga aagaccaccc    2580
gattggctcg taagatgggt catatcaaca taataggatc ttccatgttg gaagcagaac    2640
aaaagttaga gtacattcta gaagaatcaa cccacttacc atccagtact gtatcagctg    2700
acactaaacc gttggttgga gttatcatgg gttcagactc tgatctacct gtgatttcga    2760
aaggttgcga tattttaaaa cagtttggtg ttccattcga agttactatt gtctctgctc    2820
atagaacacc acagagaatg accagatatg cctttgaagc cgctagtaga ggtatcaagg    2880
ctatcattgc aggtgctggt ggtgctgctc atcttccagg aatggttgct gccatgactc    2940
cgttgccagt cattggtgtt cctgtcaagg gctctacgtt ggatggtgta gactcgctac    3000
actcgattgt ccaaatgcct agaggtgttc ctgtggctac ggttgctatc aacaacgcca    3060
ccaatgccgc tctgttggcc atcaggattt taggtacaat tgaccacaaa tggcaaaagg    3120
aaatgtccaa gtatatgaat gcaatggaga ccgaagtgtt ggggaaggca tccaacttgg    3180
aatctgaagg gtatgaatcc tatttgaaga atcgtctttg aatttagtat tgttttttaa    3240
tagatgtata tataatagta cacgtaactt atctattcca ttcataattt tattttaaag    3300
```

```
gttcggtaga aatttgtcct ccaaaaagtt ggttagagcc tggcagtttt gataggcatt    3360
attatagatt gggtaatatt taccctgcac ctggaggaac tttgcaaaga gcctcatgtg    3420
cggcgcgcca ggccataatg gccaaacggt ttctcaatta ctatatacta ctaaccattt    3480
acctgtagcg tatttctttt ccctcttcgc gaaagctcaa gggcatcttc ttgactcatg    3540
aaaaatatct ggatttcttc tgacagatca tcacccttga gcccaactct ctagcctatg    3600
agtgtaagtg atagtcatct tgcaacagat tattttggaa cgcaactaac aaagcagata    3660
cacccttcag cagaatcctt tctggatatt gtgaagaatg atcgccaaag tcacagtcct    3720
gagacagttc ctaatcttta ccccatttac aagttcatcc aatcagactt cttaacgcct    3780
catctggctt atatcaagct taccaacagt tcagaaactc ccagtccaag tttcttgctt    3840
gaaagtgcga agaatggtga caccgttgac aggtacacct ttatgggaca ttcccccaga    3900
aaaataatca agactgggcc tttagagggt gctgaagttg acccttggt gcttctggaa     3960 aaagaactga agggcaccag acaagcgcaa cttcctggta ttcctcgtct aagtggtggt    4020
gccataggat acatctcgta cgattgtatt aagtactttg aaccaaaaac tgaaagaaaa    4080
ctgaaagatg tttttgcaact tccggaagca gctttgatgt tgttcgacac gatcgtggct    4140
tttgacaatg tttatcaaag attccaggta attggaaacg tttctctatc cgttgatgac    4200
tcggacgaag ctattcttga gaaatattat aagacaagag aagaagtgga aaagatcagt    4260
aaagtggtat ttgacaataa aactgttccc tactatgaac agaaagatat tattcaaggc    4320
caaacgttca cctctaatat tggtcaggaa gggtatgaaa accatgttcg caagctgaaa    4380
gaacatattc tgaaaggaga catcttccaa gctgttccct ctcaaagggt agccaggccg    4440
acctcattgc acccttttcaa catctatcgt catttgagaa ctgtcaatcc ttctccatac    4500
atgttctata ttgactatct agacttccaa gttgttggtg cttcacctga attactagtt    4560
aaatccgaca acaacaacaa aatcatcaca catcctattg ctggaactct tcccagaggt    4620
aaaactatcg aagaggacga caattatgct aagcaattga agtcgtcttt gaaagacagg    4680
gccgagcacg tcatgctggt agatttggcc agaaatgata ttaaccgtgt gtgtgagccc    4740
accagtacca cggttgatcg tttattgact gtggagagat tttctcatgt gatgcatctt    4800
gtgtcagaag tcagtggaac attgagacca acaagactc gcttcgatgc tttcagatcc    4860
attttcccag caggaaccgt ctccggtgct ccgaaggtaa gagcaatgca actcatagga    4920
gaattggaag gagaaaagag aggtgtttat gcggggggccg taggacactg gtcgtacgat    4980
ggaaaatcga tggacacatg tattgcctta agaacaatgg tcgtcaagga cggtgtcgct    5040
taccttcaag ccggaggtgg aattgtctac gattctgacc cctatgacga gtacatcgaa    5100
accatgaaca aaatgagatc caacaataac accatcttgg aggctgagaa aatctggacc    5160
gataggttgg ccagagacga gaatcaaagt gaatccgaag aaaacgatca atgaacggag    5220
gacgtaagta ggaatttatg gtttggccat aatggcctag cttggcgtaa tcatggtcat    5280
agctgtttcc tgtgtgaaat tgttatccgc tcacaattcc acacaacata cgagccggaa    5340
gcataaagtg taaagcctgg ggtgcctaat gagtgagcta actcacatta attgcgttgc    5400
gctcactgcc cgctttccag tcgggaaacc tgtcgtgcca gctgcattaa tgaatcggcc    5460
aacgcgcggg gagaggcggt ttgcgtattg ggcgctcttc cgcttcctcg ctcactgact    5520
cgctgcgctc ggtcgttcgg ctgcggcgag cggtatcagc tcactcaaag gcggtaatac    5580
ggttatccac agaatcaggg gataacgcag gaaagaacat gtgagcaaaa ggccagcaaa    5640
aggccaggaa ccgtaaaaag gccgcgttgc tggcgttttt ccataggctc cgcccccctg    5700
```

```
acgagcatca caaaaatcga cgctcaagtc agaggtggcg aaacccgaca ggactataaa    5760
gataccaggc gtttccccct ggaagctccc tcgtgcgctc tcctgttccg accctgccgc    5820
ttaccggata cctgtccgcc tttctcccct cgggaagcgt ggcgctttct catagctcac    5880
gctgtaggta tctcagttcg gtgtaggtcg ttcgctccaa gctgggctgt gtgcacgaac    5940
cccccgttca gcccgaccgc tgcgccttat ccggtaacta tcgtcttgag tccaacccgg    6000
taagacacga cttatcgcca ctggcagcag ccactggtaa caggattagc agagcgaggt    6060
atgtaggcgg tgctacagag ttcttgaagt ggtggcctaa ctacggctac actagaagga    6120
cagtatttgg tatctgcgct ctgctgaagc cagttacctt cggaaaaaga gttggtagct    6180
cttgatccgg caaacaaacc accgctggta gcggtggttt ttttgtttgc aagcagcaga    6240
ttacgcgcag aaaaaaagga tctcaagaag atcctttgat cttttctacg ggtctgacg    6300 ctcagtggaa cgaaaactca cgttaaggga ttttggtcat gagattatca aaaaggatct    6360
tcacctagat ccttttaaat taaaatgaa gttttaaatc aatctaaagt atatatgagt    6420
aaacttggtc tgacagttac caatgcttaa tcagtgaggc acctatctca gcgatctgtc    6480
tatttcgttc atccatagtt gcctgactcc ccgtcgtgta gataactacg atacgggagg    6540
gcttaccatc tggccccagt gctgcaatga taccgcgaga cccacgctca ccggctccag    6600
atttatcagc aataaaccag ccagccggaa gggccgagcg cagaagtggt cctgcaactt    6660
tatccgcctc catccagtct attaattgtt gccgggaagc tagagtaagt agttcgccag    6720
ttaatagttt gcgcaacgtt gttgccattg ctacaggcat cgtggtgtca cgctcgtcgt    6780
ttggtatggc ttcattcagc tccggttccc aacgatcaag gcgagttaca tgatccccca    6840
tgttgtgcaa aaaagcggtt agctccttcg gtcctccgat cgttgtcaga gtaagttgg    6900 ccgcagtgtt atcactcatg gttatggcag cactgcataa ttctcttact gtcatgccat    6960
ccgtaagatg cttttctgtg actggtgagt actcaaccaa gtcattctga ataagtgta    7020 tgcggcgacc gagttgctct tgcccggcgt caatacggga taataccgcg ccacatagca    7080
gaactttaaa agtgctcatc attggaaaac gttcttcggg gcgaaaactc tcaaggatct    7140
taccgctgtt gagatccagt tcgatgtaac ccactcgtgc acccaactga tcttcagcat    7200
cttttacttt caccagcgtt tctgggtgag caaaaacagg aaggcaaaat gccgcaaaaa    7260
agggaataag ggcgacacgg aaatgttgaa tactcatact cttcctttt caatattatt    7320 gaagcattta tcagggttat tgtctcatga gcggatacat atttgaatgt atttagaaaa    7380
ataaacaaat aggggttccg cgcacatttc cccgaaaagt gccacctgac gtctaagaaa    7440
ccattattat catgacatta acctataaaa ataggcgtat cacgaggccc tttcgtctcg    7500
cgcgtttcgg tgatgacggt gaaaacctct gacacatgca gctcccggag acggtcacag    7560
cttgtctgta agcggatgcc gggagcagac aagcccgtca gggcgcgtca gcgggtgttg    7620
gcgggtgtcg ggctggctt aactatgcgg catcagagca gattgtactg agagtgcacc    7680
atatgcggtg tgaaataccg cacagatgcg taaggagaaa ataccgcatc aggcgccatt    7740
cgccattcag gctgcgcaac tgttgggaag ggcgatcggt gcgggcctct tcgctattac    7800
gccagctggc gaaggggga tgtgctgcaa ggcgattaag ttgggtaacg ccagggtttt    7860
cccagtcacg acgttgtaaa acgacggcca gtgaattg                           7898

<210> SEQ ID NO 8
<211> LENGTH: 10763
<212> TYPE: DNA
```

<213> ORGANISM: Artificial Sequence
<220> FEATURE:
<223> OTHER INFORMATION: Synthetic

<400> SEQUENCE: 8

```
cgcggggat ctcccatgtc tctactggtg gtggtgcttc tttggaatta ttggaaggta      60
aggaattgcc aggtgttgct ttcttatccg aaaagaaata aattgaattg aattgaaatc    120
gtagatcaat ttttttcttt tctctttccc catcctttac gctaaaataa tagtttattt    180
tatttttga atattttta tttatatacg tatatataga ctattattta tcttttaatg    240
attattaaga tttttattaa aaaaaaattc gctcctcttt taatgccttt atgcagtttt    300
ttttcccat tcgatatttc tatgttcggg ttcagcgtat tttaagttta ataactcgaa    360
aattctgcgt tcgttaaagc ttggcgtaat catggtcata gctgtttcct gtgtgaaatt    420
gttatccgct cacaattcca cacaacatac gagccggaag cataaagtgt aaagcctggg    480
gtgcctaatg agtgagctaa ctcacattaa ttgcgttgcg ctcactgccc gctttccagt    540
cgggaaacct gtcgtgccag agcttcgtaa ccgacagttt ctaactttg tgctttgaca    600
agaacttctt cttcttgctt taataaaaac tgttccattt tcgttgtata acttgaatca    660
taagcgccaa gcagtctgac agccaacagc gcagcgttcg tactattatt aatagcgacg    720
gtagctactg gaacacctct aggcatttgc acaattgaat gtaaagaatc tactccatct    780
agacaagaac cttttacggg cacaccgatg acaggaagtg gtgtcattgc agccaccata    840
cctggcaagt gagcagcccc accagctcca gcgataattg ttttaattcc acgcttgctt    900
gcggaaatag catatgctga catcctatgt ggagttctat gagcagagac tattgtcact    960
tcaaatggaa cgccaaaatc ttttaaaacc gcacatgcgg cagacattac cggcaagtca   1020
gagtctgatc ccatgatgat tccaaccaat ggtttgacca ttgcttccaa gtccaacttt   1080
tgagcgacag agattttgat tggaatatca gttctacctg taatgtagtt cagcctttgt   1140
tcacattccg ccatactgga ggcaataata tttatgtgac ctactttct gttaggtcta   1200
gactcttttc catataagta cactgaggaa cctggagtcg ccaatgctct ttcgcaagtt   1260
tctagctctt tatctttgt atgtttgtct ccaagaacat ttagcataat ggcgttcgtt   1320
gtaatggtgg agaaagatgt gaaattcttt ggcattggca aatccaatat tgatctcaaa   1380
tgagcttcaa attgagaagt gacgcaagca tcaatgtat aatgtccaga gttgtgaggc   1440
cttgggcaa tttcgttaat aagcaattcc cctgtttcta aatagaacat tccacacca    1500
aatataccac aaccgggaaa agatttgatt gcattttctg ccaacaactt cgccttaagt   1560
tgaacggagt ccggaactct agcaggcgca taacataagt cacaaatatt gtccttgtgg   1620
atagtctcta caattgggta agaaaacact aaaccgttaa cagatctcac aatcatgact   1680
gctaattctt tagtaaatgg tgcccatttt tcggcgtaca aaggacgatc cttcagtact   1740
tccaaagctt ccggaatcat ttccttattc tttacaacga agttacctct tccatcgtat   1800
gccaaagtcc tcgacttcaa gacgaatgga aaacccaaat ctcttccaac attcaatagg   1860
gacgtctcac tggcttgttc cacaggaaca ctttgggtaa ctgctatacc attttgatt   1920
aaatgctctt tttgaatata tttgtcttgt atcaatctga ttgtttctgg agaagggtaa   1980
atttttaatt tgggatgttt tacttgaaga ttctttagtg taggaacatc aacatgctca   2040
atctcaatcg ttagcacatc acatttttca gctagttttt cgatatcaag aggattggaa   2100
aaggagccat taacgtggtc attggagttg cttattgtt tggcaggaga attttcagca   2160
tctagtatta ccgtcttaat gttgagcctg tttgctgcct caacaatcat acgtcccaat   2220
```

```
tgtcccctc ctaatatacc aactgttcta gaatccatac ttgattgttt tgtccgattt    2280
tcttgttttt cttgattgtt atagtaggat gtacttagaa gagagatcca acgattttac    2340
gcaccaattt atacatgaaa tgctccataa tattgtccat ttagttctta ataaaaggtc    2400
agcaagagtc aatcacttag tattacccgg ttcgtagcca tgcaacaaga gtcatttgtc    2460
agcatagctg taataatcaa tcatgacgta agaaatgtat cataattaaa agttgttaaa    2520
gatgtcagtg ttatgttggt gttacaaaat tctcggcttc tcactaatat ttaatatctc    2580
ttaaatttta tctgtctttg attcttttaa gaaaagttat gtattattca agaaaaagtc    2640
aattccgcat caaaaggtaa aatttatata aactgcttta aaatttcatg aaactaggca    2700
acttttcgaa atgatctttt tcgagcatga agtttctttt ataataacct ggtcaaaagc    2760
tctgcattaa tgaatcggcc aacgcgcggg gagaggcggt ttgcgtattg ggcgctcttc    2820
cgcttcctcg ctcactgact cgctgcgctc ggtcgttcgg ctgcggcgag cggtatcagc    2880
tcactcaaag gcggtaatac ggttatccac agaatcaggg gataacgcag gaaagaacat    2940
gtgagcaaaa ggccagcaaa aggccaggaa ccgtaaaaag gccgcgttgc tggcgttttt    3000
ccataggctc cgcccccctg acgagcatca caaaaatcga cgctcaagtc agaggtggcg    3060
aaacccgaca ggactataaa gataccaggc gtttccccct ggaagctccc tcgtgcgctc    3120
tcctgttccg accctgccgc ttaccggata cctgtccgcc tttctccctt cgggaagcgt    3180
ggcgctttct catagctcac gctgtaggta tctcagttcg gtgtaggtcg ttcgctccaa    3240
gctgggctgt gtgcacgaac ccccgttca gcccgaccgc tgcgccttat ccggtaacta    3300
tcgtcttgag tccaacccgg taagacacga cttatcgcca ctggcagcag ccactggtaa    3360
caggattagc agagcgaggt atgtaggcgg tgctacagag ttcttgaagt ggtggcctaa    3420
ctacggctac actagaagaa cagtatttgg tatctgcgct ctgctgaagc cagttacctt    3480
cggaaaaaga gttggtagct cttgatccgg caaacaaacc accgctggta gcggtggttt    3540
ttttgtttgc aagcagcaga ttacgcgcag aaaaaaagga tctcaagaag atcctttgat    3600
cttttctacg gggtctgacg ctcagtggaa cgaaaactca cgttaaggga ttttggtcat    3660
gagattatca aaaaggatct tcacctagat ccttttaaat taaaaatgaa gttttaaatc    3720
aatctaaagt atatatgagt aaacttggtc tgacagttac caatgcttaa tcagtgaggc    3780
acctatctca gcgatctgtc tatttcgttc atccatagtt gcctgactcc ccgtcgtgta    3840
gataactacg atacgggagg gcttaccatc tggccccagt gctgcaatga taccgcgaga    3900
cccacgctca ccggctccag atttatcagc aataaaccag ccagccggaa gggccgagcg    3960
cagaagtggt cctgcaactt tatccgcctc catccagtct attaattgtt gccgggaagc    4020
tagagtaagt agttcgccag ttaatagttt gcgcaacgtt gttgccattg ctacaggcat    4080
cgtggtgtca cgctcgtcgt ttggtatggc ttcattcagc tccggttccc aacgatcaag    4140
gcgagttaca tgatccccca tgttgtgcaa aaaagcggtt agctccttcg gtcctccgat    4200
cgttgtcaga agtaagttgg ccgcagtgtt atcactcatg gttatggcag cactgcataa    4260
ttctcttact gtcatgccat ccgtaagatg cttttctgtg actggtgagt actcaaccaa    4320
gtcattctga gaatagtgta tgcggcgacc gagttgctct tgcccggcgt caatacggga    4380
taataccgcg ccacatagca gaactttaaa agtgctcatc attggaaaac gttcttcggg    4440
gcgaaaactc tcaaggatct taccgctgtt gagatccagt tcgatgtaac ccactcgtgc    4500
acccaactga tcttcagcat cttttacttt caccagcgtt tctgggtgag caaaaacagg    4560
```

```
aaggcaaaat gccgcaaaaa agggaataag ggcgacacgg aaatgttgaa tactcatact    4620 cttcctttt  caatattatt gaagcattta tcagggttat tgtctcatga gcggatacat    4680
atttgaatgt atttagaaaa ataaacaaat aggggttccg cgcacatttc cccgaaaagt    4740
gccacctgac gtctaagaaa ccattattat catgacatta acctataaaa ataggcgtat    4800
cacgaggccc tttcgtctcg cgcgtttcgg tgatgacggt gaaaacctct gacacatgca    4860
gctcccggag acggtcacag cttgtctgta agcggatgcc gggagcagac aagcccgtca    4920
gggcgcgtca gcgggtgttg gcgggtgtcg gggctggctt aactatgcgg catcagagca    4980
gattgtactg agagtgcacc atatgcggtg tgaaataccg cacagatgcg taaggagaaa    5040
ataccgcatc aggcgccatt cgccattcag gctgcgcaac tgttgggaag ggcgatcggt    5100
gcgggcctct tcgctattac gccagctggc gaaaggggga tgtgctgcaa ggcgattaag    5160
ttgggtaacg ccagggtttt cccagtcacg acgttgtaaa acgacggcca gtgaattaat    5220
tccacggact atagactata ctagtatact ccgtctactg tacgatacac ttccgctcag    5280
gtccttgtcc tttaacgagg ccttaccact cttttgttac tctattgatc cagctcagca    5340
aaggcagtgt gatctaagat tctatcttcg cgatgtagta aaactagcta gaccgagaaa    5400
gagactagaa atgcaaaagg cacttctaca atggctgcca tcattattat ccgatgtgac    5460
gctgcagctt ctcaatgata ttcgaatacg ctttgaggag atacagccta atatccgaca    5520
aactgtttta cagatttacg atcgtacttg ttacccatca ttgaattttg aacatccgaa    5580
cctgggagtt ttccctgaaa cagatagtat atttgaacct gtataataat atatagtcta    5640
gcgctttacg gaagacaatg tatgtatttc ggttcctgga gaaactattg catctattgc    5700
ataggtaatc ttgcacgtcg catccccggt tcattttctg cgtttccatc ttgcacttca    5760
atagcatatc tttgttaacg aagcatctgt gcttcatttt gtagaacaaa aatgcaacgc    5820
gagagcgcta atttttcaaa caaagaatct gagctgcatt tttacagaac agaaatgcaa    5880
cgcgaaagcg ctattttacc aacgaagaat ctgtgcttca tttttgtaaa acaaaaatgc    5940
aacgcgagag cgctaatttt tcaaacaaag aatctgagct gcattttac  agaacagaaa    6000 tgcaacgcga gagcgctatt ttaccaacaa agaatctata cttcttttt  gttctacaaa    6060 aatgcatccc gagagcgcta ttttctaac  aaagcatctt agattacttt ttttctcctt    6120
tgtgcgctct ataatgcagt ctcttgataa ctttttgcac tgtaggtccg ttaaggttag    6180
aagaaggcta ctttggtgtc tattttctct tccataaaaa aagcctgact ccacttcccg    6240
cgtttactga ttactagcga agctgcgggt gcatttttc  aagataaagg catccccgat    6300
tatattctat accgatgtgg attgcgcata cttgtgaac agaaagtgat agcgttgatg     6360
attcttcatt ggtcagaaaa ttatgaacgg tttcttctat tttgtctcta tatactacgt    6420
ataggaaatg tttacatttt cgtattgttt tcgattcact ctatgaatag ttcttactac    6480
aatttttttg tctaaagagt aatactagag ataaacataa aaaatgtaga ggtcgagttt    6540
agatgcaagt tcaaggagcg aaaggtggat gggtaggtta tatagggata tagcacagag    6600
atatatagca aagagatact tttgagcaat gtttgtggaa gcggtattcg caatatttta    6660
gtagctcgtt acagtccggt gcgttttggt ttttttgaaa gtgcgtcttc agagcgcttt    6720
tggttttcaa aagcgctctg aagttcctat actttctaga aataggaac  ttcggaatag    6780 gaacttcaaa gcgtttccga aaacgagcgc ttccgaaaat gcaacgcgag ctgcgcacat    6840
acagctcact gttcacgtcg cacctatatc tgcgtgttgc ctgtatata  atatacatga    6900 gaagaacggc atagtgcgtg tttatgctta aatgcgtact tatatgcgtc tatttatgta    6960
```

```
ggatgaaagg tagtctagta cctcctgtga tattatccca ttccatgcgg ggtatcgtat    7020
gcttccttca gcactaccct ttagctgttc tatatgctgc cactcctcaa ttggattagt    7080
ctcatccttc aatgctatca tttcctttga tattggatca tatgcatagt accgagaaac    7140
tagtgcgaag tagtgatcag gtattgctgt tatctgatga gtatacgttg tcctggccac    7200
ggcagaagca cgcttatcgc tccaatttcc cacaacatta gtcaactccg ttaggccctt    7260
cattgaaaga atgaggtca tcaaatgtct tccaatgtga gattttgggc cattttttat     7320
agcaaagatt gaataaggcg cattttcct caaagcttta ttgtacgatc tgactaagtt     7380 atctttaat aattggtatt cctgttatt gcttgaagaa ttgccggtcc tatttactcg      7440
ttttaggact ggttcagaat taattctcat gtttgacagc ttatcatcgc gataagcttt    7500
tcaattcatc atttttttt tattctttt tttgatttcg gtttccttga aatttttttg      7560
attcggtaat ctccgaacag aaggaagaac gaaggaagga gcacagactt agattggtat    7620
atatacgcat atgtagtgtt gaagaaacat gaaattgccc agtattctta acccaactgc    7680
acagaacaaa aacctgcagg aaacgaagat aaatcatgtc gaaagctaca tataaggaac    7740
gtgctgctac tcatcctagt cctgttgctg ccaagctatt taatatcatg cacgaaaagc    7800
aaacaaactt gtgtgcttca ttggatgttc gtaccaccaa ggaattactg gagttagttg    7860
aagcattagg tcccaaaatt tgtttactaa aaacacatgt ggatatcttg actgattttt    7920
ccatggaggg cacagttaag ccgctaaagg cattatccgc caagtacaat ttttactct     7980 tcgaagacag aaaatttgct gacattggta atacagtcaa attgcagtac tctgcgggtg    8040
tatacagaat agcagaatgg gcagacatta cgaatgcaca cggtgtggtg ggcccaggta    8100
ttgttagcgg tttgaagcag gcggcagaag aagtaacaaa ggaacctaga ggcctttga    8160 tgttagcaga attgtcatgc aagggctccc tatctactgg agaatatact aagggtactg    8220
ttgacattgc gaagagcgac aaagattttg ttatcggctt tattgctcaa agagacatgg    8280
gtggaagaga tgaaggttac gattggttga ttatgacacc cggtgtgggt ttagatgaca    8340
agggagacgc attgggtcaa cagtatagaa ccgtggatga tgtggtctct acaggatctg    8400
acattattat tgttggaaga ggactatttg caaagggaag ggatgctaag gtagagggtg    8460
aacgttacag aaaagcaggc tgggaagcat atttgagaag atgcggccag caaaactaaa    8520
aaactgtatt ataagtaaat gcatgtatac taaactcaca aattagagct tcaatttaat    8580
tatatcagtt attacccgat caaaaatcat cgcttcgctg attaattacc ccagaaataa    8640
ggctaaaaaa ctaatcgcat tatcatccta tggttgttaa tttgattcgt tcatttgaag    8700
gtttgtgggg ccaggttact gccaatttt cctcttcata accataaaag ctagtattgt     8760
agaatcttta ttgttcggag cagtgcggcg cgaggcacat ctgcgtttca ggaacgcgac    8820
cggtgaagac gaggacgcac ggaggagagt cttccttcgg agggctgtca cccgctcggc    8880
ggcttctaat ccgtacttca atatagcaat gagcagttaa gcgtattact gaaagttcca    8940
aagagaaggt tttttaggc taatcgacct cgagcagatc cgccaggcgt gtatatagcg     9000
tggatggcca ggcaacttta gtgctgacac atacaggcat atatatatgt gtgcgacgac    9060
acatgatcat atggcatgca tgtgctctgt atgtatataa aactcttgtt ttcttctttt    9120
ctctaaatat tctttcctta tacattaggt cctttgtagc ataaattact atacttctat    9180
agacacgcaa acacaaatac acacactaaa ttaccggatc catggagcaa gctcaatggg    9240
tcgacccaac tctgctccct gcatttgtgg gcatcatctt cttcttcctt ggcatgttct    9300
```

| | |
|---|---|
| ttggaaggag ttctttggga gctgggaagg gtgcagcgcc tagaagcacc agttctaccg | 9360 |
| agtggccaga cggccctcca aagctgccca tcatcggcaa cctgcaccag ctcaacaaag | 9420 |
| gcggggagct ggtccaccac aacctcgcca agctcgccca gtcctacgac cgcgccatga | 9480 |
| ccatctgggt cggcagctgg ggccccatga tcgtcgtcag cgacgccgac cttgcatggg | 9540 |
| aggtcctcgt caccaagtcg ccggacttcg ccggccgggt gctctccaag ctctcgcact | 9600 |
| tgttcaacgc caactacaac accgtcgtcg cctacgacgc cgggccgcaa tggcagtcgc | 9660 |
| tccggcgagg tctgcagcac gggccgctcg gccccgccca tgtttctgcg caggctcgtt | 9720 |
| tccacgaaga agacatgaag ctcctggtga gcgacatgat gagagcagca cagaaaggtg | 9780 |
| gtagcaatgg agtggttgaa cctctggcct atgtccggcg agccactatc cgatttctgt | 9840 |
| ctcgtctatg ctttggggag gccttcaacg acgaggcgtt cgtggagggg atggacgaag | 9900 |
| cagtggagga gaccatcgga gccactggcc atgcacgcat cctcgacgcc ttctacttca | 9960 |
| ctcgccacct ccctatcatc cgccgcagct tcatagatac cgtcaacgcc aagaagaaga | 10020 |
| tcgagagcct tgtccggccg ttgctctccc ggccggcgcc accggggtct tacctccact | 10080 |
| tcctcctttc caccgacgcg ccggagaata tgatcatctt tcgaatattc gaagtctact | 10140 |
| tgctgggcgt ggacagcacc gcctccacca ccacatgggc tctcgccttc ctcgtctcca | 10200 |
| accaacaggc gcaggagaag ctccacaatg agctcgccca gtactgcgcc agccagaaca | 10260 |
| atcagatcat caaagcagac gacgtcggaa agctgtcgta cctgctcggg gtagtgaagg | 10320 |
| agacgatgag gatgaagccg atagcgccgc tggccgtccc ccacaagacg ctcaaggaga | 10380 |
| cgatgctcga cggaaagagg gtggcggcgg gaacgacggt ggtagtgaac ctctatgccg | 10440 |
| tccactacaa cccgaagcta tggccggagc cggagcagtt ccgcccggag aggttcgtgg | 10500 |
| tcggcgccag cggcggcaat ggtgggggt cttccgagta catgctgcag tcgtacctgc | 10560 |
| cctttggagg ggggatgagg tcctgcgcag ggatggaggt gggaaagttg caggtggcga | 10620 |
| tggtcgtggc caaccttgtg atggcattta aatggttgcc ggaggaggag gggaagatgc | 10680 |
| cggacctggc tgaagacatg accttcgtgc tcatgatgaa gaagccattg gctgccaaaa | 10740 |
| tcgttccacg tgcatgagaa ttc | 10763 |

<210> SEQ ID NO 9
<211> LENGTH: 5024
<212> TYPE: DNA
<213> ORGANISM: Artificial Sequence
<220> FEATURE:
<223> OTHER INFORMATION: Synthetic

<400> SEQUENCE: 9

| | |
|---|---|
| atgtaagtta gctcactcat taggcacccc aggctttaca ctttatgctt ccggctcgta | 60 |
| taatgtgtgg aattgtgagc ggataacaat ttcacacagg aaacaggatc gatccatcga | 120 |
| tgagcttact ccccatcccc ctgttgacaa ttaatcatcg gctcgtataa tgtgtggaat | 180 |
| tgtgagcgga taacaatttc acacaggaaa caggatcagc ttactcccca tcccctgtt | 240 |
| gacaattaat catcggctcg tataatgtgt ggaattgtga gcggataaca atttcacaca | 300 |
| ggaaacagga tccatcgatg cttaggaggt catttccgct tggcggtatt ccttcaccta | 360 |
| gcactctcga gcaccaccac caccaccact aataagaatt catcgatgat aagctgtcaa | 420 |
| acatgagcag atcgagcccg cctaatgag cgggcttttt tttcagatct gcttgaagac | 480 |
| gaaagggcct cgtgatacgc ctattttat aggttaatgt catgataata atggtttctt | 540 |
| agacgatgcg tcaaagcaac catagtacgc gccctgtagc ggcgcattaa gcgcggcggg | 600 |

```
tgtggtggtt acgcgcagcg tgaccgctac acttgccagc gccctagcgc ccgctccttt    660
cgctttcttc ccttcctttc tcgccacgtt cgccggcttt ccccgtcaag ctctaaatcg    720
ggggctccct ttagggttcc gatttagagc tttacggcac ctcgacccca aaaaacttga    780
tttgggtgat ggtcacgta gtgggccatc gccctgatag acggttttc gccctttgac      840 gttggagtcc acgttcttta atagtggact cttgttccaa actggaacaa cactcaaccc    900
tatctcgggc tattctttg atttataagg gattttgccg atttcggcct attggttaaa    960
aaatgagctg atttaacaaa aatttaacgc gaattttaac aaaatattaa cgtttacaat   1020
ttcatcgtca ggtggcactt tcggggaaa tgtgcgcgga accctatt gtttattttt      1080 ctaaatacat tcaaatatgt atccgctcat gagacaataa ccctgataaa tgcttcaata   1140
atattgaaaa aggaagagta tgagtattca acatttccgt gtcgcccta ttccctttt     1200 tgcggcattt tgccttcctg ttttgctca cccagaaacg ctggtgaaag taaaagatgc    1260
tgaagatcag ttgggtgcac gagtgggtta catcgaactg gatctcaaca gcggtaagat   1320
ccttgagagt tttcgccccg aagaacgttt tccaatgatg agcacttta aagttctgct   1380 atgtggcgcg gtattatccc gtgttgacgc cgggcaagag caactcggtc gccgcataca   1440
ctattctcag aatgacttgg ttgagtactc accagtcaca gaaaagcatc ttacggatgg   1500
catgacagta agagaattat gcagtgctgc cataaccatg agtgataaca ctgcggccaa   1560
cttacttctg acaacgatcg gaggaccgaa ggagctaacc gcttttttgc acaacatggg   1620
ggatcatgta actcgccttg atcgttggga accggagctg aatgaagcca taccaaacga   1680
cgagcgtgac accacgatgc ctgcagcaat ggcaacaacg ttgcgcaaac tattaactgg   1740
cgaactactt actctagctt cccggcaaca attaatagac tggatggagg cggataaagt   1800
tgcaggacca cttctgcgct cggcccttcc ggctggctgg tttattgctg ataaatctgg   1860
agccggtgag cgtgggtctc gcggtatcat tgcagcactg gggccagatg gtaagccctc   1920
ccgtatcgta gttatctaca cgacggggag tcaggcaact atggatgaac gaaatagaca   1980
gatcgctgag ataggtgcct cactgattaa gcattggtaa ctgtcagacc aagtttactc   2040
atatatactt tagattgatt taaaacttca tttttaattt aaaaggatct aggtgaagat   2100
cctttttgat aatctcatga ccaaaatccc ttaacgtgag ttttcgttcc actgagcgtc   2160
agaccccgta gaaaagatca aaggatcttc ttgagatcct ttttttctgc gcgtaatctg   2220
ctgcttgcaa acaaaaaaac caccgctacc agcggtggtt tgtttgccgg atcaagagct   2280
accaactctt tttccgaagg taactggctt cagcagagcg cagataccaa atactgtcct   2340
tctagtgtag ccgtagttag gccaccactt caagaactct gtagcaccgc ctacatacct   2400
cgctctgcta atcctgttac cagtggctgc tgccagtggc gataagtcgt gtcttaccgg   2460
gttggactca agacgatagt taccggataa ggcgcagcgg tcgggctgaa cggggggttc   2520
gtgcacacag cccagcttgg agcgaacgac ctacaccgaa ctgagatacc tacagcgtga   2580
gctatgagaa agcgccacgc ttcccgaagg gagaaaggcg gacaggtatc cggtaagcgg   2640
cagggtcgga acaggagagc gcacgaggga gcttccaggg ggaaacgcct ggtatcttta   2700
tagtcctgtc gggtttcgcc acctctgact tgagcgtcga ttttgtgat gctcgtcagg    2760 ggggcggagc ctatggaaaa acgccagcaa cgcggccttt ttacggttcc tggccttttg   2820
ctggcctttt gctcacatgt tctttcctgc gttatcccct gattctgtgg ataaccgtat   2880
taccgccttt gagtgagctg ataccgctcg ccgcagccga acgaccgagc gcagcgagtc   2940
```

```
agtgagcgag gaagcggaag agcgcctgat gcggtatttt ctccttacgc atctgtgcgg   3000
tatttcacac cgcataatgg tgcactctca gtacaatctg ctctgatgcc gcatagttaa   3060
gccagtatac actccgctat cgctacgtga ctgggtcatg gctgcgcccc gacacccgcc   3120
aacacccgct gacgcgccct gacgggcttg tctgctcccg gcatccgctt acagacaagc   3180
tgtgaccgtc tccgggagct gcatgtgtca gaggttttca ccgtcatcac cgaaacgcgc   3240
gaggcagaac gccatcaaaa ataattcgcg tctggccttc ctgtagccag ctttcatcaa   3300
cattaaatgt gagcgagtaa caacccgtcg gattctccgt gggaacaaac ggcggattga   3360
ccgtaatggg ataggtcacg ttggtgtaga tgggcgcatc gtaaccgtgc atctgccagt   3420
ttgaggggac gacgacagta tcggcctcag gaagatcgca ctccagccag ctttccggca   3480
ccgcttctgg tgccggaaac caggcaaagc gccattcgcc attcaggctg cgcaactgtt   3540
gggaagggcg atcggtgcgg gcctcttcgc tattacgcca gctggcgaaa ggggggatgtg   3600
ctgcaaggcg attaagttgg gtaacgccag gttttcccca gtcacgacgt tgtaaaacga   3660
cggccagtga atccgtaatc atggtcatag ctgtttcctg tgtgaaattg ttatccgctc   3720
acaattccac acattatacg agccggaagc ataaagtgta aagcctgggg tgcctaatga   3780
gtgagctaac ttcacattaat tgcgttgcgc tcactgcccg ctttccagtc gggaaacctg   3840
tcgtgccagc tgcattaatg aatcggccaa cgcgcgggga ggcggttt gcgtattggg   3900
cgccagggtg tttttctttt tcaccagtga cgggcaac agctgattgc ccttcaccgc   3960
ctggccctga gagagttgca gcaagcggtc cacgctggtt tgccccagca ggcgaaaatc   4020
ctgtttgatg gtggttaacg gcgggatata acatgagctg tcttcggtat cgtcgtatcc   4080
cactaccgag atatccgcac caacgcgcag cccggactcg gtaatggcgc gcattgcgcc   4140
cagcgccatc tgatcgttgg caaccagcat cgcagtggga acgatgccct cattcagcat   4200
ttgcatggtt tgttgaaaac cggacatggc actccagtcg ccttcccgtt ccgctatcgg   4260
ctgaatttga ttgcgagtga gatatttatg ccagccagcc agacgcagac gcgccgagac   4320
agaacttaat gggcccgcta acagcgcgat ttgctggtga cccaatgcga ccagatgctc   4380
cacgcccagt cgcgtaccgt cttcatggga gaaaataata ctgttgatgg gtgtctggtc   4440
agagacatca agaaataacg ccggaacatt agtgcaggca gcttccacag caatggcatc   4500
ctggtcatcc agcggatagt taatgatcag cccactgacg cgttgcgcga agattgtg   4560
caccgccgct ttacaggctt cgacgccgct tcgttctacc atcgacacca ccacgctggc   4620
acccagttga tcggcgcgag atttaatcgc cgcgacaatt tgcgacggcg cgtgcagggc   4680
cagactggag gtggcaacgc caatcagcaa cgactgtttg cccgccagtt gttgtgccac   4740
gcggttggga atgtaattca gctccgccat cgccgcttcc acttttcccc gcgttttcgc   4800
agaaacgtgg ctggcctggt tcaccacgcg ggaaacggtc tgataagaga caccggcata   4860
ctctgcgaca tcgtataacg ttactggttt cacattcacc accctgaatt gactctcttc   4920
cgggcgctat catgccatac cgcgaaaggt tttgcaccat tcgatggtgt cctggcacga   4980
caggtttccc gactggaaag cgggcagtga gcgcaacgca atta              5024
```

<210> SEQ ID NO 10
<211> LENGTH: 6164
<212> TYPE: DNA
<213> ORGANISM: Artificial Sequence
<220> FEATURE:
<223> OTHER INFORMATION: Synthetic

<400> SEQUENCE: 10

-continued

```
ggtctcaccc tgaattcgca tctagatggt agagccacaa acagccggta caagcaacga        60
tctccaggac catctgaatc atgcgcggat gacacgaact cacgacggcg atcacagaca       120
ttaacccaca gtacagacac tgcgacaacg tggcaattcg tcgcaatacc gtctcactga       180
actggccgat aattgcagac gcagttcgag tttatcatta tcaatactgc catttcaaag       240
aatacgtaaa taattaatag tagtgatttt cctaacttta tttagtcaaa aaattagcct       300
tttaattctg ctgtaacccg tacatgccca aaataggggg cgggttacac agaatatata       360
acatcgtagg tgtctgggtg aacagtttat tcctggcatc cactaaatat aatggagccc       420 gcttttaag ctggcatcca gaaaaaaaaa gaatcccagc accaaaatat tgttttcttc        480
accaaccatc agttcatagg tccattctct tagcgcaact acagagaaca ggggcacaaa       540
caggcaaaaa acgggcacaa cctcaatgga gtgatgcaac ctgcctggag taatgatga       600 cacaaggcaa ttgacccacg catgtatcta tctcattttc ttacaccttc tattaccttc       660
tgctctctct gatttggaaa aagctgaaaa aaaaggttga aaccagttcc ctgaaattat       720
tcccctactt gactaataag tatataaaga cggtaggtat tgattgtaat tctgtaaatc       780
tatttcttaa acttcttaaa ttctactttt atagttagtc ttttttttag ttttaaaaca       840
ccaagaactt agtttcgaat aaacacacat aaacaaacaa aagatcatgg ttgaagcatt       900
gacaattgat agagttccag atcatattgc tagagcagtt gttgatccac atgcttatgc       960
agaatgggat ggtttacatg ctatgttggc agaattaaga agagaacatc catttgctag      1020
agcagatttg gaaggttacg atccattttg ggttgcttct aaacatgcag atattcaaga      1080
agtttgtaga agacatgatt tgtaccaaaa cggtacttac ttcatcggta caagaaaggt      1140
tttggaatta gaatattcaa ctggtaaagc atctcaagaa agagttattc aagctatgaa      1200
tgcaccagaa cacatgaaat acagaagatt aactcaaggt tggttccaac ctaaaaattt      1260
gagaaaattg gatgaaagat tcagaagaat cgcaagaggt tatgttgatc aaatggttga      1320
attgggtggt gaatgtgaat ttttccatgc tattggtgtt agatacccat tgttagttat      1380
tatgtcaatc ttgggttttgc cagatgatgc tgaagccttt atgatgagat tgactcaaaa      1440
cgttacaaac atggatgatg ctgaattgac aggtttacca gctccaaaaa ctgcagaaga      1500
aagagcacaa agatcattag caatgtctaa cgaagctaga gtttacttcg atgaattgtc      1560
aagagctaga agagcatctc caactgatga tgtttcaaca ttgatcgcta acgcaacaat      1620
cgaaggtaaa ccaatttctg aaccagatat tttgggttac tacatgactg ttgctattgc      1680
aggtcatgat actacatctg catcattgtc tggtgctatt tgggctttag cagaaagacc      1740
agctgaattg gcaaaagtta aggcagattt gtcattaatc ccaaatttgg ttgaagaagc      1800
tgttagatgg actacaccaa ttactcattt cttgagaaca gcagttagag atactgtttt      1860
tagaggtcaa ccaattgcta agggtgacta cgtttttgttg tcatacactt ctggtaacag      1920
agatgaagaa gttttcgatg atccattcga gtttaaagtt ggtagaaaga aaatgaaca       1980 agttgcattc ggttatggtc acatgtttg tttgggtcaa catttggcta gaatggaaat      2040
gaacattttc tttgaagaat tgttgccaag attgaaatct ttggaattag ctggtacacc      2100
acaaagaaag atcacttctt caatgggtgg tccaaaatct gttccaatta gataccaaat      2160
gtcagattac aaggacgatg atgataagga ctacaaagat gatgatgaca aagattataa      2220
ggacgatgat gataaaggtc atcatcatca tcatcactaa ctcgagataa agcaatcttg      2280
atgaggataa tgatttttttt ttgaatatac ataaatacta ccgttttttct gctagatttt      2340
```

```
gtgatgacgt aaataagtac atattacttt ttaagccaag acaagattaa gcattaactt    2400
tacccttttc tttctaagtt tcaatattag ttatcactgt ttaaaagtta tggcgagaac    2460
gtcggcggtt aaaatatatt accctgaacg gctgtgagac cagtagtgat tttcctaact    2520
ttatttagtc aaaaaattag cctttaatt ctgctgtaac ccgtacatgc ccaaaatagg    2580
gggcgggtta cacagaatat ataacatcgt aggtgtctgg gtgaacagtt tattcctggc    2640
atccactaaa tataatggag cccgcttttt aagctggcat ccagaaaaaa aagaatccc    2700 agcaccaaaa tattgttttc ttcaccaacc atcagttcat aggtccattc tcttagcgca    2760
actacagaga acaggggcac aaacaggcaa aaacgggca caacctcaat ggagtgatgc    2820
aacctgcctg gagtaaatga tgacacaagg caattgaccc acgcatgtat ctatctcatt    2880
ttcttacacc ttctattacc ttctgctctc tctgatttgg aaaaagctga aaaaaaggt    2940 tgaaaccagt tccctgaaat tattcccta cttgactaat aagtatataa agacggtagg    3000
tattgattgt aattctgtaa atctatttct taaacttctt aaattctact tttatagtta    3060
gtcttttttt tagttttaaa acaccaagaa cttagtttcg aataaacaca cataaacaaa    3120
caaaagatca tggctaaatt gaatgttgtt actagagaag gtcaagaagt tgttttggaa    3180
ggtgaagaag gtttgtctgt tatggaaatc atcagagatg gtgtatcga tgaattgtta    3240 gctttgtgtg gtggttgttg ttcttgtgca acatgtcatg ttcatgttga ccagcttttt    3300
gcagataaat taccaccaat ttcagaagat gaaaacgatt gttagattc ttcagatcat    3360 agaaacgatc aatcaagatt gtcatgtcaa ttgactttt cagctgaatt ggatggttta    3420
agagttacaa ttgcaccaga agatgattac aaggacgatg atgataagga ctacaaagat    3480
gatgatgaca agattataa ggacgatgat gataaggtc atcatcatca tcatcactaa    3540
ctcgagataa agcaatcttg atgaggataa tgattttttt ttgaatatac ataaatacta    3600 ccgttttct gctagatttt gtgatgacgt aaataagtac atattacttt ttaagccaag    3660
acaagattaa gcattaactt tacccttttc tttctaagtt tcaatattag ttatcactgt    3720
ttaaaagtta tggcgagaac gtcggcggtt aaaatatatt accctgaacg gctgtgagac    3780
cagtagtgat tttcctaact ttatttagtc aaaaaattag cctttaatt ctgctgtaac    3840 ccgtacatgc ccaaaatagg gggcgggtta cacagaatat ataacatcgt aggtgtctgg    3900
gtgaacagtt tattcctggc atccactaaa tataatggag cccgctttt aagctggcat    3960 ccagaaaaaa aagaatccc agcaccaaaa tattgttttc ttcaccaacc atcagttcat    4020
aggtccattc tcttagcgca actacagaga acaggggcac aaacaggcaa aaacgggca    4080 caacctcaat ggagtgatgc aacctgcctg gagtaaatga tgacacaagg caattgaccc    4140
acgcatgtat ctatctcatt ttcttacacc ttctattacc ttctgctctc tctgatttgg    4200
aaaaagctga aaaaaaggt tgaaaccagt tccctgaaat tattcccta cttgactaat    4260 aagtatataa agacggtagg tattgattgt aattctgtaa atctatttct taaacttctt    4320
aaattctact tttatagtta gtcttttttt tagttttaaa acaccaagaa cttagtttcg    4380
aataaacaca cataaacaaa caaaagatca tggatcatta cgatgttttg atcgttggtg    4440
ctggtcatgg tggtgcacaa gctgcagttt ctttaagaca attgaacttc gaaggttcaa    4500
tcggtttgtt aggtgacgaa gctgatccac catacgaaag accaccattg tctaaggaat    4560
acttctcagg tgaaaagact ttcgaaagaa ttttgatcag accagcttct ttttggggtg    4620
acagaaacgt ttcattgtta ttgaacagaa gagttactgc tgttgatgtt ccaggtcata    4680
gagttacatt agcagatggt tcttcattat cttacggtaa attgatttgg gctactggtg    4740
```

```
gtgcaccaag aagattatca tgtgttggtg gtgacttgaa aggtgttcat ggtgttagaa    4800
caagagttga tgcagatgct atgttgtctg aaatcgaatc agttgaacaa gttgttgtta    4860
ttggtggtgg ttatattggt ttagaagctg cagctgtttt gtctaagttc ggtaaacatg    4920
ttactgtttt ggaagcattg gatagagttt tagcaagagt tgctggtgaa ccattgtcaa    4980
gattctacga aaacgaacat agagcacatg gtgttgatgt tagattgaat gcaatggtta    5040
ctgaaattga gggtaaagat ggtcatgttt ctggtgttaa attgggtgac ggtacaattt    5100
tgccagctca aatggttatt gtcggtatcg gtatcattcc agctgttgaa ccattaattg    5160
cagctggtgc agttggttct aatggtgttg atgttgatga acattgtcaa acatcattgc    5220
cagatatata tgctattggt gactgtgcag ctcatgttaa tggttttgca gctgatgcta    5280
gaattagatt agaatctgtt caaaacgcaa acgatcaagc aactacagct gttaaagcaa    5340
ttgttggtca accacaacca tatcatgctg ttccttggtt ttggtctaat caatacgatt    5400
tgagattgca aactgttggt ttgtcaacag gttttgatga agttgttcaa agaggtgacc    5460
cagcagctag atcattttct atcgtttatt tgagaaatgg taaagttatt gctttggatt    5520
gtgttaacgc agttaaggat tacgttcaag gtagagcttt agttactggt ggtattgcac    5580
cagctaaaga tgcattggct aacccagaaa tcccattgaa gacattggtt ccagcagatt    5640
acaaggacga tgatgataag gactacaaag atgatgatga caaagattat aaggacgatg    5700
atgataaagg tcatcatcat catcatcact aactcgagat aaagcaatct tgatgaggat    5760
aatgattttt ttttgaatat acataaatac taccgttttt ctgctagatt ttgtgatgac    5820
gtaaataagt acatattact ttttaagcca agacaagatt aagcattaac tttaccctttt   5880
tctttctaag tttcaatatt agttatcact gtttaaaagt tatggcgaga acgtcggcgg    5940
ttaaaatata ttaccctgaa cggctgtgag accggtctca gctgagcatg agacggaaat    6000
ctgctcgtca gtggtgctca cactgacgaa tcatgtacag atcataccga tgactgcctg    6060
gcgactcaca actaagcaag acagccggaa ccagcgccgg cgaacaccac tgcatatatg    6120
gcatatcaca acagtccaac tagtgcactg cagtacatga gacc                     6164
```

ENZYMATIC DEGRADATION OF MYCOTOXINS DURING GRAIN PROCESSING

RELATED APPLICATIONS

This application is a Continuation of U.S. application Ser. No. 17/199,274 titled "Enzymatic Degradation of Mycotoxins During Grain Processing" filed Mar. 11, 2021, which claims the benefit of U.S. Provisional Application No. 62/988,670 titled "Enzymatic Degradation of Mycotoxins During Fermentation and Post-Fermentation" filed Mar. 12, 2020, which are both incorporated herein by reference.

TECHNICAL FIELD

Provided herein are methods, compositions, and genetically modified microorganisms for mitigating mycotoxin contamination of corn and other feedstocks used in bioprocessing and food and feed production.

SEQUENCE LISTING

An official copy of the sequence listing is submitted concurrently with the specification electronically via EFS-Web as an ASCII formatted sequence listing with a file name of PT-141-US03_SEQ_LIST_ST25, a creation date of Jul. 30, 2021, and a size of about 66 kilobytes. The sequence listing contained in this ASCII formatted document is part of the specification and is herein incorporated by reference in its entirety.

BACKGROUND OF THE INVENTION

Mycotoxins are naturally occurring toxins produced by fungi resulting in contaminated food and feed, especially cereals, forages, grain, fruits, and manufactured products. Mycotoxin contamination is monitored, and increased mycotoxin loading results in lower prices, and/or loss of crops or food products with considerable economic consequences. Consumption of contaminated grains or feeds can result in decreased efficiency in weight gain and reproductivity in livestock. In humans, effects can range from mild gastrointestinal symptoms to liver damage, neurotoxicity, and cancer.

Many common mycotoxins are resistant to most forms of food and feed processing, and in fact, can become more concentrated during processing. For example, as components in the feedstock are separated or consumed the fraction of mycotoxin in the remaining material may increase. In one illustrative example, starch in the feedstock is converted via fermentation to a chemical and CO2 and the fraction of mycotoxin in the remaining unfermented material is greater than it was in the feedstock resulting in higher mycotoxin levels in fermentation by-products such as distillers' dried grains with solubles (DDGS). Processing grains into human foods also results in increased levels of mycotoxins. As such, it is important that mycotoxin contamination is mitigated in foods designed for human consumption and livestock feeds.

The present invention is directed toward overcoming one or more of the problems discussed above.

SUMMARY OF THE INVENTION

Provided herein are methods of mitigating mycotoxin contamination in a feed or food product produced in a dry mill or wet mill grain processing facility. In some aspects, the methods comprise (i) contacting a feedstock or process stream of a dry mill or wet mill grain processing facility with an enzyme selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, Zearalenone hydrolase, xylanase, DepA/DepB, and 2cys-peroxiredoxin; and (ii) producing a food or feed product from a process stream downstream of said contacting step.

In some aspects, the contacting comprises contacting whole grain, cracked grain, steeped grain, steep water, steep liquor, flour, slurry, beer, whole stillage, wet cake, thin stillage, concentrated thin stillage, defatted concentrated thin stillage (e.g. syrup), germ, oil, fiber, protein, starch, or combinations thereof, with a microorganism expressing the enzyme. In some aspects, the contacting comprises contacting whole grain, cracked grain, steeped grain, steep water, steep liquor, flour, slurry, beer, whole stillage, wet cake, thin stillage, concentrated thin stillage, defatted concentrated thin stillage (e.g. syrup), germ, oil, fiber, protein, starch, or combinations thereof, with a lysate obtained from a microorganism expressing the enzyme.

In some aspects, the contacting comprises contacting the feed stock or process stream with a microorganism expressing an enzyme selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, Zearalenone hydrolase, xylanase, DepA/DepB, and 2cys-peroxiredoxin, a broth containing a such a microorganism, a lysate formed by lysing a such a microorganism, a concentrate of such a microorganism or lysate, or combinations thereof.

In some embodiments, provided herein are grains and compositions sourced from mycotoxin contaminated grains wherein the contaminated grain or compositions are exposed to an enzyme to mitigate mycotoxin contamination. The resulting compositions have decreased levels of mycotoxin relative to compositions not exposed to the enzyme. Exposure to the enzyme can be through exposure to a microorganism expressing an enzyme to mitigate mycotoxin contamination. Exposure to the enzyme can be through exposure to materials obtained from lysing the microorganism which expresses the mycotoxin mitigating enzyme, i.e. a lysate.

In some embodiments, a human food composition sourced from mycotoxin contaminated grain exposed to a mycotoxin mitigating enzyme or a microorganism expressing an enzyme to mitigate mycotoxin contamination is provided. In some aspects, the levels of mycotoxin in the human food composition are decreased relative to the levels of mycotoxin in a human food composition sourced from mycotoxin contaminated grain without exposure to a mycotoxin mitigating enzyme or a microorganism expressing an enzyme to mitigate mycotoxin contamination.

In some embodiments, corn starch sourced from mycotoxin contaminated grain exposed to a mycotoxin mitigating enzyme or a microorganism expressing an enzyme to mitigate mycotoxin contamination is provided. In some aspects, the levels of mycotoxin in the corn starch is decreased relative to the levels of mycotoxin in corn starch sourced from mycotoxin contaminated grain without exposure to a mycotoxin mitigating enzyme or a microorganism expressing an enzyme to mitigate mycotoxin contamination.

In some embodiments, corn syrup sourced from mycotoxin contaminated grain exposed to a mycotoxin mitigating enzyme or a microorganism expressing an enzyme to mitigate mycotoxin contamination is provided. In some aspects, the levels of mycotoxin in the corn syrup is decreased relative to the levels of mycotoxin in corn syrup sourced from mycotoxin contaminated grain without exposure to a mycotoxin mitigating enzyme or a microorganism expressing an enzyme to mitigate mycotoxin contamination.

In some embodiments, a livestock feed composition comprising distiller's grain sourced from feedstock fermented in the presence of an enzyme to mitigate mycotoxin contamination or a microorganism expressing an enzyme to mitigate mycotoxin contamination is provided. In some aspects, the levels of mycotoxin in the livestock feed composition are decreased relative to the levels of mycotoxin in a livestock feed composition obtained from a feedstock fermented in the absence of a microorganism expressing an enzyme to mitigate mycotoxin contamination.

In some embodiments, a livestock feed composition comprising distiller's grain sourced from a post-fermentation whole stillage, wet cake, thin stillage and/or concentrated thin stillage (e.g. syrup) stream treated with an enzyme to mitigate mycotoxin contamination or a microorganism expressing an enzyme to mitigate mycotoxin contamination is provided. In some aspects, the levels of mycotoxin in the livestock feed composition are decreased relative to the levels of mycotoxin in a livestock feed composition obtained from an untreated post-fermentation whole stillage, wet cake, thin stillage and/or concentrated thin stillage (e.g. syrup) stream.

In some embodiments, a livestock feed composition comprising distiller's grain sourced from beer treated with an enzyme to mitigate mycotoxin contamination or a microorganism expressing an enzyme to mitigate mycotoxin contamination is provided. In some aspects, the levels of mycotoxin in the livestock feed composition are decreased relative to the levels of mycotoxin in a livestock feed composition obtained from untreated beer.

In some aspects, the mycotoxin is selected from the group consisting of aflatoxin, ochratoxin A, patulin, T-2, HT-2, beauvericin, neosolaniol, nivalenol, deoxynivalenol (DON), 3-ADON, 15-ADON, trichothecene, ochratoxin, and zearalenone.

In some aspects, the enzyme is selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, and lactono hydrolase, xylanase, peroxidase, and 2cys-peroxiredoxin. In some aspects, the enzyme can be a combination of enzymes, for example, an enzyme system that works in two or more steps to detoxify a mycotoxin. For example, the enzyme system can be DepA/DepB, where DepA converts DON to 3-keto-DON and DepB, an NADPH dependent dehydrogenase, catalyzes the reduction of 3-keto-DON to 3-epi-DON.

In some aspects, the microorganism is a bacteria. In some aspects, the microorganism is a yeast. In some aspects, the microorganism is engineered to express and/or excrete a mycotoxin mitigating enzyme. In some aspects, the microorganism is a yeast such as *S. cerevisiae* or *Pichia pastoris*. In some aspects, the microorganism is a genetically modified commodity yeast or a genetically modified consolidated bioprocessing yeast, wherein the yeast is genetically modified to express a mycotoxin mitigating enzyme.

In some embodiments, the mycotoxin mitigating enzyme is expressed by a yeast host cell.

In some aspects, the human food composition or the livestock feed composition contains mycotoxins at levels less than about 10 ppm, less than about 8 ppm, less than about 5 ppm, less than about 3 ppm, or less than about 2 ppm.

In some embodiments, a method of producing corn starch is provided. In some aspects, the method comprises inoculating a mycotoxin contaminated corn with one or more yeast strains prior to or during steeping wherein at least one yeast strain expresses a mycotoxin mitigating enzyme. In some aspects, the mycotoxin mitigating enzyme is deoxynivalenol hydroxylase. In some aspects, the method further comprises processing the corn to produce corn starch. In some aspects, the method further comprises processing the corn starch to produce corn syrup.

In some embodiments, a method of producing corn starch is provided. In some aspects, the method comprises exposing a mycotoxin contaminated corn with a lysate obtained from a microorganism expressing a mycotoxin mitigating enzyme prior to or during steeping. In some aspects, the mycotoxin mitigating enzyme is deoxynivalenol hydroxylase. In some aspects, the method further comprises processing the corn to produce corn starch. In some aspects, the method further comprises processing the corn starch to produce corn syrup.

In some embodiments, a method of fermentation is provided. In some aspects, the method comprises inoculating a mycotoxin contaminated feedstock with one or more yeast strains, wherein at least one yeast strain expresses a mycotoxin mitigating enzyme. In some aspects, the mycotoxin mitigating enzyme is deoxynivalenol hydroxylase. The feedstock can be inoculated during yeast propagation and/or can be inoculated during fermentation. In some aspects, the method further comprises fermenting the feedstock to produce ethanol and distiller's grain.

In some embodiments, a method of fermentation is provided. In some aspects, the method comprises exposing a mycotoxin contaminated feedstock with a lysate obtained from a microorganism expressing a mycotoxin mitigating enzyme. In some aspects, the mycotoxin mitigating enzyme is deoxynivalenol hydroxylase. The exposure of the feedstock to the lysate can occur prior to or during fermentation. In some aspects, the method further comprises fermenting the feedstock to produce ethanol and distiller's grain.

In some aspects, the feedstock is contaminated with a mycotoxin, for example, deoxynivalenol. After exposure to the mycotoxin mitigating enzyme, for example, by a microorganism expressing a mycotoxin mitigating enzyme or to a lysate containing the enzyme, during fermentation, the levels of mycotoxin, e.g., deoxynivalenol, in the resulting fermentation by-products, e.g., distiller's grain, are decreased relative to the levels of mycotoxin in by-products obtained from a feedstock processed in the absence of enzyme exposure, e.g. such as exposure to a yeast expressing a mycotoxin mitigating enzyme such as deoxynivalenol hydroxylase or exposure to a yeast lysate containing the mycotoxin mitigating enzyme.

In some embodiments, a method of mitigating mycotoxin contamination in a human food composition is provided. In some aspects, the method comprises processing a grain in the presence of a mycotoxin mitigating enzyme or a microorganism expressing an enzyme, wherein the enzyme is selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, xylanase, and 2cys-peroxiredoxin. In some aspects, the enzyme can be a combination of enzymes, for example, an enzyme system that works in two or more steps to detoxify a mycotoxin. For example, the enzyme system can be DepA/DepB, where DepA converts DON to 3-keto-DON and DepB, an NADPH dependent dehydrogenase, catalyzes the reduction of 3-keto-DON to 3-epi-DON.

In some embodiments, a method of mitigating mycotoxin contamination in livestock feed is provided. In some aspects, the method comprises processing a feedstock in the presence of a mycotoxin mitigating enzyme or a microorganism expressing an enzyme, wherein the enzyme is selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, xylanase, and 2cys-peroxiredoxin. In some aspects, the method comprises processing a feedstock in the presence of two or more mycotoxin mitigating enzymes, for example, DepA and DepB. In some aspects, the method comprises processing a feedstock in the presence of a microorganism expressing two or more enzymes, for example, DepA and DepB.

In some embodiments, a method of mitigating mycotoxin contamination in livestock feed is provided. In some aspects, the method comprises contacting a post-fermentation whole stillage, wet cake, thin stillage and/or concentrated thin stillage (e.g. syrup) stream with an enzyme to mitigate mycotoxin contamination, wherein the levels of mycotoxin in the livestock feed composition are decreased relative to the levels of mycotoxin in a livestock feed composition obtained from an untreated post-fermentation whole stillage, wet cake, thin stillage and/or concentrated thin stillage (e.g. syrup) stream.

In some embodiments, a method of mitigating mycotoxin contamination in livestock feed is provided. In some aspects, the method comprises contacting beer with an enzyme to mitigate mycotoxin contamination, wherein the levels of mycotoxin in the livestock feed composition are decreased relative to the levels of mycotoxin in a livestock feed composition obtained from untreated beer.

In some embodiments, a vector comprising the nucleic acid sequence encoding a mycotoxin mitigating enzyme is provided. For example, a vector comprising a nucleic acid sequence of SEQ ID NO: 1, or nucleic acid sequence having at least about 95%, or at least about 98%, or at least about 99% sequence identity to SEQ ID NO: 1, encodes deoxynivalenol hydroxylase. In some embodiments, the vector further comprises one or more nucleic acid sequences encoding a KdR gene or KdX gene. In some embodiments, the ddnA gene (SEQ ID NO: 1) is in one vector, the KdR gene is in another vector, and the KdX gene is in yet another vector. In some embodiments, all three genes are in one vector. In some embodiments, at least two of the ddnA gene, the KdR gene, and the KdX gene are in the same vector. In some embodiments, a vector comprises the nucleic acid sequences of one or both of DepA and DepB.

In some aspects, the vector is selected from the group consisting of pYEDP60 (S. cerevisiae) or pPINK (P. pastoris), though other commercially available vectors are known to those skilled in the art.

In some embodiments, a nucleic acid sequence of a mycotoxin mitigating enzyme is integrated into the genome of the microorganism, for example, via homologous recombination.

In some embodiments, a microorganism expressing one or more proteins encoded by the vector described herein is provided. In some aspects, the microorganism is selected from a yeast or a bacteria. In some aspects, the microorganism is engineered to express and/or excrete a mycotoxin mitigating enzyme. In some aspects, the microorganism is a genetically modified commodity yeast or a genetically modified consolidated bioprocessing yeast, wherein the yeast is genetically modified to express a mycotoxin mitigating enzyme. In some aspects, the microorganism is *S. cerevisiae*. In some aspects, the yeast is *Pichia pastoris*.

In some embodiments, use of a microorganism engineered to comprise the nucleic acid sequence encoding a mycotoxin mitigating enzyme is provided. In some aspects, the nucleic acid sequence is provided in a vector described herein. In some aspects, the nucleic acid sequence is integrated into the genome of the microorganism. In some aspects, the use comprises expressing a mycotoxin mitigating enzyme during fermentation, in beer, and/or in distiller's grain sourced from post-fermentation stillage, wherein fermentation feedstock is contaminated with mycotoxin. In some aspects, the mycotoxin mitigating enzyme is deoxynivalenol hydroxylase and the feedstock is contaminated with deoxynivalenol.

In some embodiments, a method for expressing a mycotoxin mitigating enzyme in a yeast host cell is provided. In some aspects, the method comprises: transforming the host cell with an integration vector comprising a nucleic acid having one or more expression cassettes comprising a nucleic acid encoding a mycotoxin mitigating enzyme, and a targeting nucleic acid that directs insertion of the integration vector into a particular location of the genome of the host cell by homologous recombination, wherein the transformed host cell produces the mycotoxin modulating enzyme.

BRIEF DESCRIPTION OF THE DRAWINGS

FIG. 1 depicts the surprising results achieved by purified enzyme addition as well as lysate addition to fermentation of a high DON corn, compared to a lack of change observed during fermentation in the absence of enzyme.

DESCRIPTION

Figure 2A:
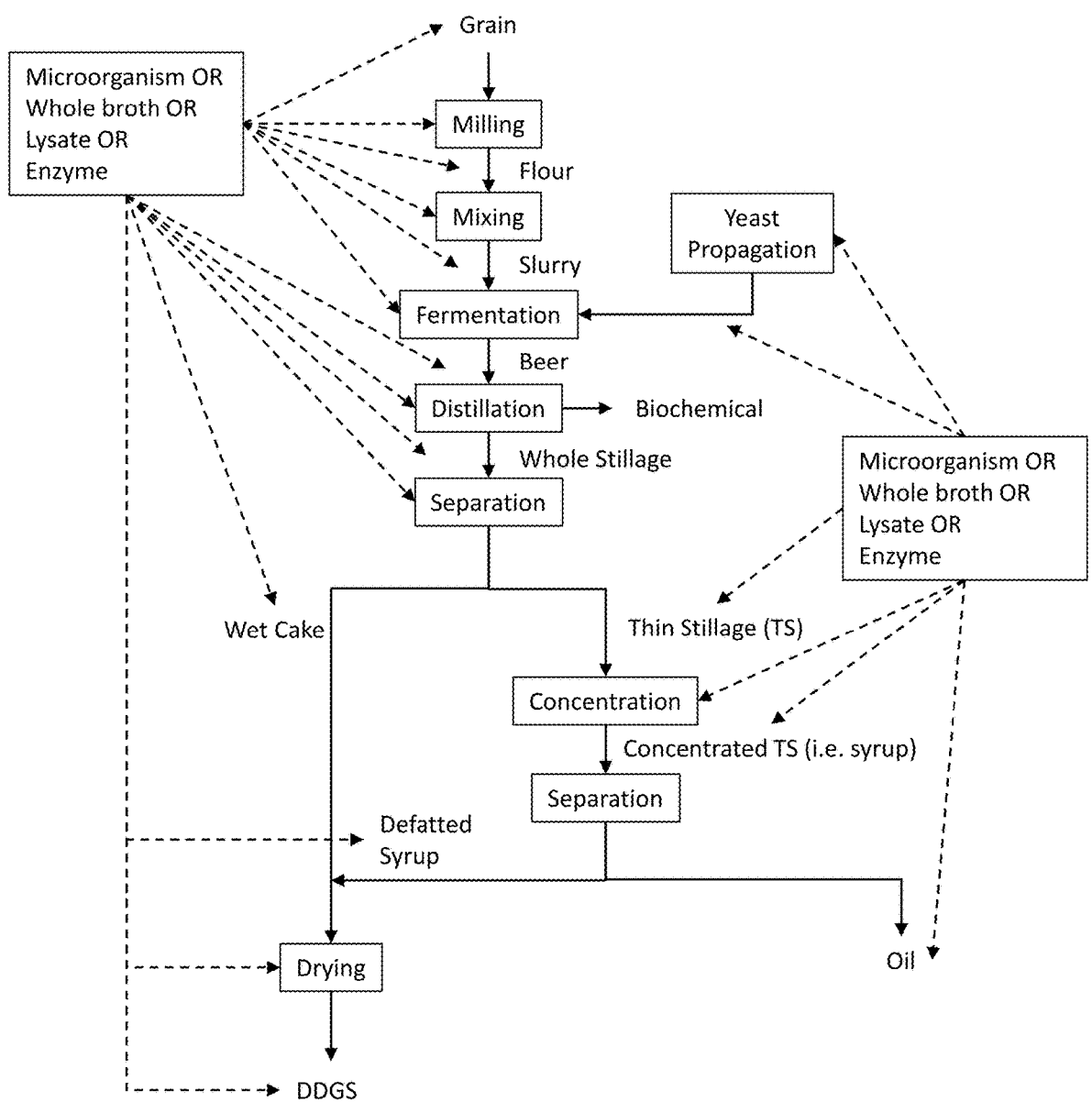
FIG. 2a is a schematic of an exemplary process showing examples of dry grind biorefinery process steps where the mycotoxin mitigating additions can be made.

As used in this specification and the appended claims, the singular forms "a", "an", and "the" include plural references unless the context clearly dictates otherwise. Thus, for example, a reference to "a method" includes one or more methods, and/or steps of the type described herein and/or which will become apparent to those persons skilled in the art upon reading this disclosure and so forth.

The word "exemplary" is used to mean serving as an example, instance, or illustration. Any embodiment or design described as "exemplary" is not necessarily to be construed as preferred or advantageous over other embodiments or designs, nor is it meant to preclude equivalent exemplary structures and techniques known to those of ordinary skill in the art. Rather, use of the word exemplary is intended to present concepts in a concrete fashion, and the disclosed subject matter is not limited by such examples.

The term "or" is intended to mean an inclusive "or" rather than an exclusive "or." To the extent that the terms "comprises," "has," "contains," and other similar words are used in either the detailed description or the claims, for the avoidance of doubt, such terms are intended to be inclusive in a manner similar to the term "comprising" as an open transition word without precluding any additional or other elements.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All patents, applications and non-patent publications mentioned in this specification are incorporated herein by reference in their entireties.

Target chemicals are produced in biorefineries with biological catalysts, e.g. via fermentation. One example is corn to ethanol but fermentation of other feedstocks and the production of other products is also contemplated herein. In biorefineries, contaminants, e.g. mycotoxins, may be concentrated in the products of the biorefinery.

Mycotoxins are produced by fungi and are present in many agricultural crops but especially in grains including corn, barley, rye, triticale, and wheat. Contamination can occur in the field, after harvest and during storage, or even during processing into food and livestock feeds. Exemplary mycotoxins and the fungi that produce them are provided in Table 1.

TABLE 1

| Mycotoxin | Fungal Species |
|---|---|
| Deoxynivalenol, nivalenol, 3-ADON, 15-ADON | *Fusarium graminearum, F. culmorum, F. crookwellense* |
| Fumonisin $B_1$, $B_2$, $B_3$ | *F. moniliform, F. verticilliodes, F. proliferatum* |
| Zearalenone | *F. graminearum, F. culmorum, F. equiseti* |
| HT-2 toxin, T-2 toxin, Neosolaniol | *F. equiseti, F. poae, F. sporotrichioides* |
| Aflatoxins $B_j$, $B_2$; cyclopiazonic acid | *Aspergillus flavus* |
| Aflatoxins $B_i$, $B_2$, $G_i$, $G_2$ | *A. parasiticus* |
| Ochratoxin A; penicillic acid | *A. ochraceus* |
| Sterigmatocystin, cyclopiazonic acid | *A. versicolor* |
| Ochratoxin B, citrinin | *Penicillium verrucosum* |
| Rubratoxins | *P. purpurogenum* |
| Patulin, citrinin | *P. expansum* |
| Beauvericin | *Beauveria bassiana* |

Any mycotoxin of importance to human and animal food chains is contemplated as a target mycotoxin, including the mycotoxins included in Table 1. A "mycotoxin mitigating enzyme" or "mycotoxin modulating enzyme" includes any enzyme capable of detoxifying mycotoxins present in grains. It has been determined herein that mycotoxin mitigating enzymes can be expressed by microorganisms and that grains and/or intermediate grain processing streams can be exposed to such microorganisms and/or expressed enzymes during the processing of the grains into food or feed products, for example, before, during, or after such nonlimiting examples as storage, steeping, milling, mixing, cooking, liquifying, saccharifying, fermenting, distilling, pumping, separating, concentrating, evaporating, filtering, drying, refining, degerminating, and/or other processes used to process grain into food or feed products. Feedstocks, intermediate streams, and/or products may also be exposed to such microorganisms and/or expressed enzymes. Non-limiting examples include whole grain, cracked grain, steeped grain, steep water, steep liquor, flour, slurry, beer, whole stillage, wet cake, thin stillage, concentrated thin stillage (e.g. syrup), defatted concentrated thin stillage (e.g. syrup), germ, oil, fiber, protein, starch, biochemicals, syrups, and dried distillers grains. Such exposure can be e.g. to the organism, a broth containing the organism, a lysate formed by lysing the organism, a concentrate of the organism or lysate, and/or to the isolated and/or concentrated enzyme. Depending on the heat tolerance of the organism or enzyme some streams may be less suitable for exposure.

Mycotoxin contamination of food and feed products can lead to adverse results. For example, in livestock feed, the presence of mycotoxins may cause animal feed refusal resulting in lack of weight gain. In processing grains into feed and food products, mycotoxins can become concentrated. For example, fermentation, solid liquid separation, evaporation, and drying processes in a biorefinery can result in concentration of mycotoxins in co-product streams like distillers grains, such as malt distillers grains, brewers grains, condensed distillers solubles, dried distillers solubles, distillers wet grains, distillers wet grains with solubles, gluten meal (e.g. protein), and gluten feed and the like used for animal feed. Similarly, in processing grains into human food products, such as corn into corn starch or corn syrup, mycotoxins may become concentrated and a threat to human health.

Deoxynivalenol (DON) is produced by several fungi in the *Fusarium* genus including *F. graminearum* and *F. culmorum*. Nivalenol (NIV), 3-ADON, 15-ADON, and T-2 toxin are also produced by the *Fusarium* fungi. The chemical structure of DON is shown below:

The three free hydroxy groups on the molecule are associated with its toxicity. In humans, DON elicits strong emetic effects after consumption, as the toxin reduces brain levels of serotonin and interacts with dopaminergic receptors in the brain. DON can be present in grains including oats, barley, wheat, corn, buckwheat, sorghum, rice, and popcorn, as well as flour, bread, breakfast cereals, noodles, infant foods, pancake mixes, noodles, beer, and malt.

Deoxynivalenol hydroxylase is an exemplary mycotoxin mitigating enzyme (encoded by DdnA, SEQ ID NO: 1). The enzyme modifies the C-16 carbon in DON, catalyzing the monooxygenation of the allylic methyl group of DON. This enzyme can also interact with NIV and 3-ADON, modifying the mycotoxins to a more tolerable, less toxic form. Methods of using this enzyme in decontaminating grains used for human or animal consumption are provided herein. Other mycotoxin mitigating enzymes include, but are not limited to, aflatoxin oxidase, 3-O acetyltransferase, peroxidase, F420H2-dependent reductases, Ery4, UDP-glycosyltransferase, laccase, manganese peroxidase, and lactono hydrolase, xylanase, DepA/DepB, and 2cys-peroxiredoxin. Microorganisms are engineered to express these enzymes are useful in the methods disclosed herein.

Aflatoxins are toxins produced by the mold *Aspergillus flavus* that can grow on food ingredients such as corn, peanuts, and other grains. At high levels, aflatoxins can cause illness (aflatoxicosis), liver damage, and death. The enzyme aflatoxin oxidase is useful in mitigating aflatoxin contamination of grains and food products produced using the contaminated grains.

Zearalenone is a potent estrogenic metabolite produced by some *Fusarium* and *Gibberella* species. The mycotoxin is heat-stable and is a contaminant of cereal crops such as maize, barley, oats, wheat, rice, and sorghum. Zearalenone concentrations are low in grain contaminated in the field, but levels increase under storage conditions with moisture greater than 30%-40%. Zearalenone is problematic for the swine industry, and particularly affects male and female reproduction. The enzymes lactonohydrolase or Zearalenone hydrolase detoxify zearalenone.

Compositions

Provided are compositions produced according to the methods disclosed herein, both for human consumption and animal consumption, which have decreased levels of mycotoxin contamination. The composition can be a human food product, e.g. any food containing grain products sourced from mycotoxin contaminated grains. Exemplary food products include most processed foods containing grains, including flour, bread, cereals, noodles, infant foods, pancake mixes, beer, and malt. The composition can be an animal feed, for example, a feed for livestock such as beef cattle, dairy cattle, swine, sheep, goats, poultry, etc., a feed for horses, donkeys, ponies, mules, etc., a feed for ruminating zoo animals, or can be a feed for companion animals such as dogs, cats, birds, etc. Acceptable levels of mycotoxins depend on the animal species and the mycotoxin. For example, maximum levels of DON are typically less than 20 ppm, for example, less than about 15 ppm, or less than 12 ppm, or less than 10 ppm, or less than 9 ppm, or less than 8 ppm, or less than 7 ppm, or less than 6 ppm, or less than 5 ppm, or less than 4 ppm, or less than 3 ppm, or less than 2 ppm, or less than 1 ppm. For example, in a feed composition for beef cattle, many sources recommend the levels of DON be 10 ppm or less; in a feed composition for dairy cattle, the levels of DON are recommended to be 2 ppm or less; in a feed composition for poultry, the levels of DON are recommended to be 2 ppm or less.

A livestock feed composition can comprise distiller's grain sourced from feedstock exposed to an enzyme to mitigate mycotoxin contamination or a microorganism expressing an enzyme to mitigate mycotoxin contamination during processing of the feedstock, e.g. during fermentation. A livestock feed composition can comprise distillers' grain sourced from stillage, wet cake, and/or a syrup stream treated with an enzyme to mitigate mycotoxin contamination or a microorganism expressing an enzyme to mitigate mycotoxin contamination. In some aspects, the levels of mycotoxin in the livestock feed composition are decreased relative to the levels of mycotoxin in a livestock feed composition obtained from untreated stillage, wet cake, and/or syrup stream. A livestock feed composition can comprise distiller's grains, such as malt distiller's grains, brewers grains, condensed distiller's solubles, dried distillers solubles, distiller's wet grains, distiller's wet grains with solubles, gluten meal, and gluten feed treated with an enzyme to mitigate mycotoxin contamination or a microorganism expressing an enzyme to mitigate mycotoxin contamination.

A typical feedstock can include any grain or cereal crop, for example, wheat, corn, sorghum, hops, oats, barley, rye, buckwheat, etc.

Systems and Methods

The microorganism expressing the mycotoxin mitigating enzyme can be inoculated into any suitable process streams and grown in situ. In an illustrative example, the microorganism can be inoculated into a mixing, steeping, propagation, saccharification, fermentation, stillage, syrup or other stream.

The microorganism expressing the mycotoxin mitigating enzyme can be grown separately and used as a whole broth to treat one or more or feed stock, process stream, or products. The culture may be concentrated prior to use, e.g., by filtering, evaporating, membrane separation, settling, centrifugation or other concentration method. The microorganism may be lysed to enhance enzyme exposure. Lysis can be accomplished by any suitable methodology known in the art. In an illustrative example, lysis is accomplished by homogenization. In an illustrative example, after growth and throughout further processing, the temperature is maintained below 150° F., even below 130° F. In an illustrative example, lysate is used or stored at or below 40° F.

Microorganisms can be grown in fed-batch or continuous fermentation methods depending on the organism used and the requirements for growth and robust enzyme expression (e.g. 1-10000 mg/L). In most cases, these organisms will be grown to late stationary phase, under conditions to promote expression of the enzymatic system. This is dependent upon the explicit system for expression, i.e. constitutive vs induced expression.

Figure 2B:
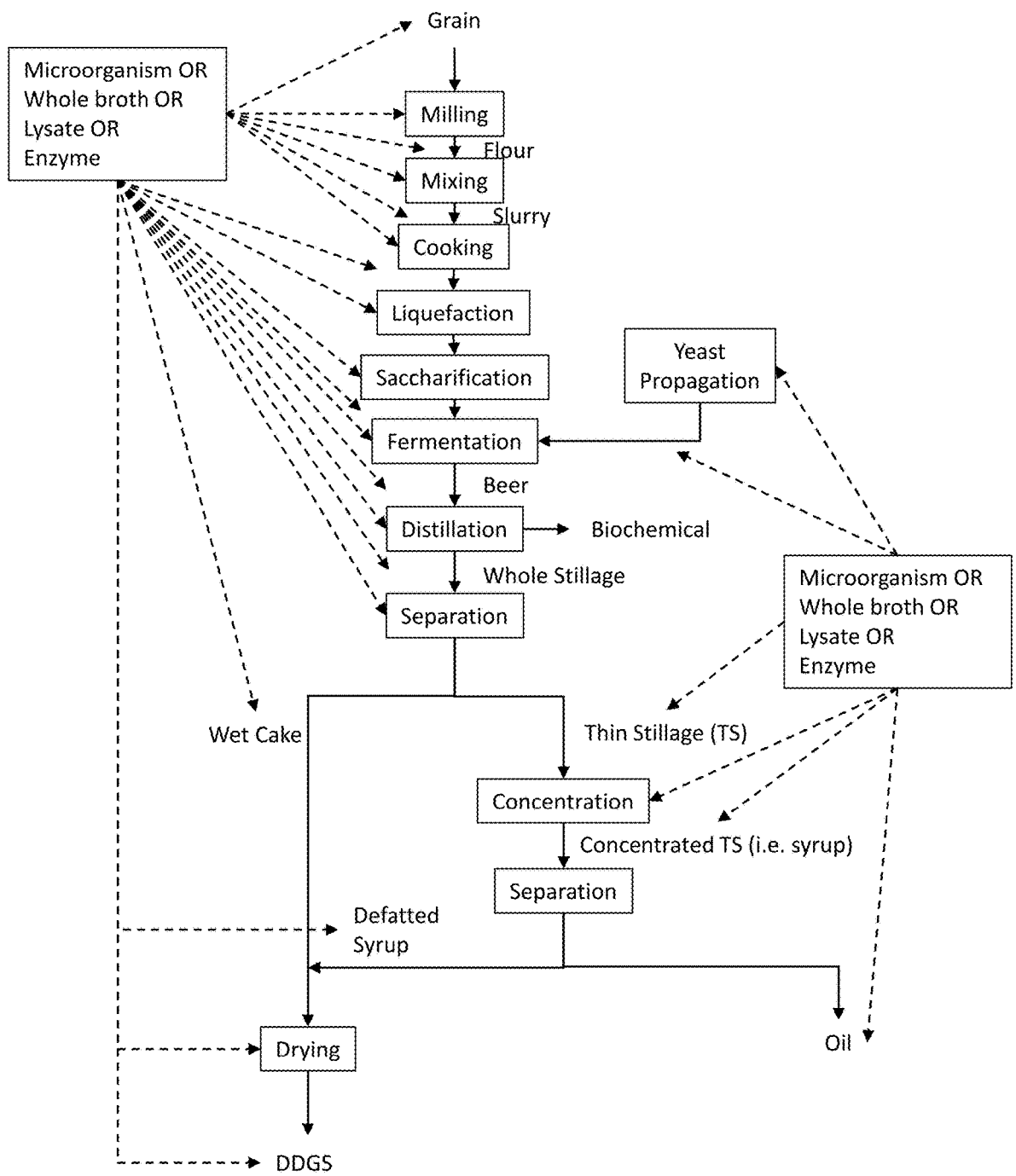
FIG. 2b is a schematic of an exemplary process showing examples of dry grind biorefinery process steps, including optional separate cooking, liquefaction, and saccharification steps, where the mycotoxin mitigating additions can be made.

In an illustrative example, exposure of one or more of feedstock, process streams and/or products in a dry mill plant, e.g. as shown in FIGS. 2a and 2b, to one or more mycotoxin mitigating enzymes can result in reduced levels of contamination of plant products. Such exposure can be to a microorganism expressing the enzyme, a broth containing the organism, a lysate formed by lysing the organism, a concentrate of the organism, broth, or lysate, and/or to the isolated and/or concentrated enzyme. For example, in a dry grind ethanol plant, grain such as corn is used as a feedstock and ethanol is produced by fermentation of the starch contained within the grain. The fermentation product includes ethanol, water, and soluble components as well as residual unfermented particulate matter (among other things). The fermentation product is distilled and dehydrated to recover ethanol. The residual matter (e.g., whole stillage) comprising water, soluble components, oil, and unfermented solids can be further processed to separate out desirable fermentation by-products, for example, dried distillers' grains with solubles (DDGS), mash, beer, whole stillage, thin stillage, wet cake, syrup, etc., used for animal feed.

Figure 2C:
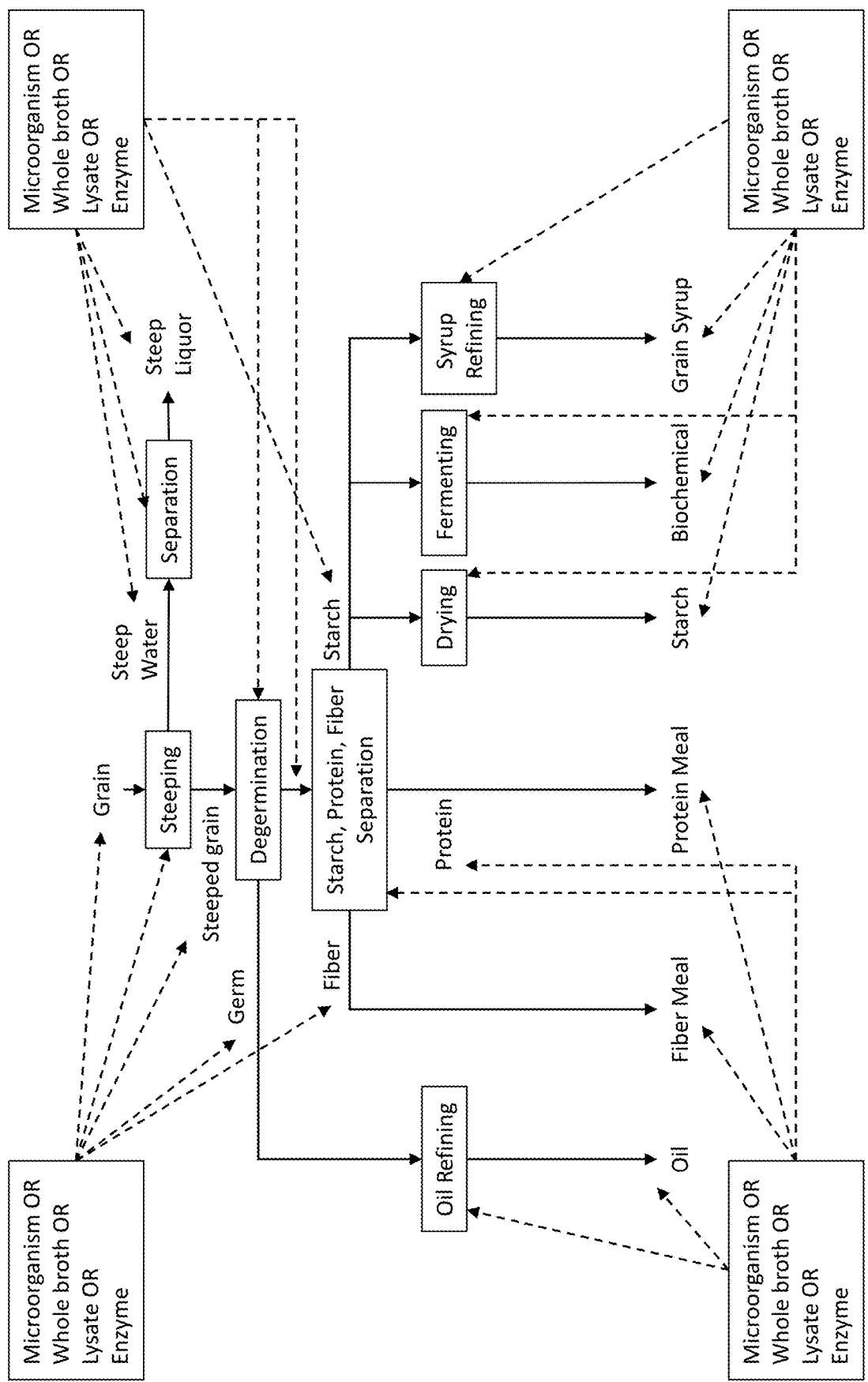
FIG. 2c is a schematic of an exemplary process showing examples of wet grind biorefinery process steps where the mycotoxin mitigating additions can be made. The fermenting step could be accompanied by one or more additional steps as shown in FIGS. 2a and 2b, e.g., cooking liquefaction, saccharification, and yeast propagation.

In an illustrative example, exposure of one or more of feedstock, process streams and/or products in a wet mill plant, e.g. as shown in FIG. 2c, to one or more mycotoxin mitigating enzymes can result in reduced levels of contamination of plant products. Such exposure can be to a microorganism expressing the enzyme, a broth containing the organism, a lysate formed by lysing the organism, a concentrate of the organism, broth, or lysate, and/or to the isolated and/or concentrated enzyme. For example, in a corn wet mill, steeping, actually a controlled fermentation, is essential for high yields and high starch quality. Cleaned corn is placed into large steeping tanks (steeps), where the corn is soaked in hot water to begin breaking the starch and protein bonds. The gluten bonds within the corn begin to loosen and release the starch. Addition of sulphur dioxide can improve the fermentation by enhancing growth of favorable microorganisms, such as lactobacillus, while suppressing detrimental bacteria, molds, fungi, and yeast. Solubles are extracted and the kernel softens. Exemplary products in addition to a biochemical such as ethanol, include corn fiber, corn and yeast protein, corn starch, corn syrup, and corn oil.

Systems for expressing enzymes useful in mitigating mycotoxin contamination of human and animal feed compositions, for example, by exposing feedstock and processing streams, include vectors containing a gene encoding a mycotoxin mitigating enzyme, and microorganisms expressing the gene. Microorganisms expressing these enzymes can be added to steep tanks, propagation and/or fermentation tanks, can be added to beer, and/or can be added to the post-fermentation stillage, wet cake, and/or syrup stream. Microorganisms expressing these enzymes can be added to mash used to prepare pellets, dog food, and cat food, for example. As an added benefit, the microorganism may add to the amino acid profile of the protein in the animal feed, e.g. the DDGS or high protein product.

In some aspects, microorganisms expressing the enzymes can be lysed and the enzyme added to steep tanks, propagation and/or fermentation tanks, can be added to beer, and/or can be added to the post-fermentation stillage, wet cake, and/or syrup stream. Lysate containing these enzymes can be added to mash used to prepare pellets, dog food, and cat food, for example. The lysed slurry can be added directly, or can be further purified to concentrate the mycotoxin mitigating enzymes before adding. In some aspects, the enzymes are purified and added to the process in a concentrated amount, for example, in the mash, beer, whole stillage, thin stillage, wet cake, syrup, DDGS, etc. Purified enzymes can be dosed, permitting controlled activity as desired at different parts of the fermentation process.

Relative to other approaches in mitigating mycotoxin contamination, the process disclosed herein is beneficial in that processing equipment is not exposed to corrosive agents typically used to reduce mycotoxin levels. Furthermore, this approach provides for a more nutritional product, with higher consistency in nutritional value, texture, taste, and appearance, as other systems used to mitigate mycotoxins can alter feed color, non-protein nitrogen, alter fat profiles, or in other ways result in a detriment to the final feed nutritional value.

Genes encoding the mycotoxin mitigating enzyme can be engineered into an ethanol production yeast so that it expresses the enzyme during propagation and/or fermentation to mitigate mycotoxin contamination present in the feedstock.

Genes encoding the mycotoxin mitigating enzyme can be engineered into a separate microorganism, e.g. yeast or bacteria, that is co-fermented with the production yeast.

Genes encoding the mycotoxin mitigating enzyme can be engineered into a separate microorganism that is independently propagated and then combined with a contaminated broth prior to distillation or combined with a post fermentation stillage, wet cake, and/or syrup stream.

Under any of the growth conditions useful in allowing the microorganism to express the mycotoxin mitigating enzyme, it can be helpful to add an iron source for improved function of the enzyme. Exemplary iron sources include $FeCl_3$. 5-aminolevulinic acid is a heme precursor and can be used as a cofactor to assist in bacterial expression and activity of the Ddna enzyme.

Methods of fermentation can comprise the steps of any typical fermentation, whether in production of biofuels or foods and drinks for human and animal consumption. However, it is shown herein that an added step of adding a microorganism expressing a mycotoxin mitigating enzyme to the fermentation process decreases the levels of mycotoxins in the food and drink products and livestock feeds.

Methods of mitigating mycotoxin contamination in livestock feed composition and/or human foods can entail fermenting a feedstock in the presence of a microorganism expressing an enzyme selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, xylanase, DepA/DepB, and 2cys-peroxiredoxin.

Methods of mitigating mycotoxin contamination in livestock feed composition and/or human foods can comprise contacting post-fermentation products including post-fermentation beer, stillage, wet cake, and/or syrup stream with an enzyme to mitigate mycotoxin contamination. The levels of mycotoxin in the livestock feed composition and/or human foods are decreased relative to the levels of mycotoxin in a livestock feed composition obtained from untreated post-fermentation products.

Methods of mitigating mycotoxin contamination in livestock feed can comprise contacting beer with an enzyme to mitigate mycotoxin contamination. The levels of mycotoxin in the livestock feed composition are decreased relative to the levels of mycotoxin in a livestock feed composition obtained from untreated beer.

Lysate containing the mycotoxin mitigating enzyme can be used in excess as needed to decontaminate the particular mycotoxin. In some aspects, the mycotoxin contaminated composition can be treated with about 50 mg lysate to about 150 mg lysate per gram solids in the treated material. In some aspects, the composition can be treated with about 80 to about 120 mg lysate per gram solids. In some aspects, the composition can be treated with about 100 mg lysate per gram solids. In purified versions, the mycotoxin mitigating enzyme would be dosed at about 5 mg enzyme to about 15 mg enzyme per gram solids, even about 8 mg enzyme to about 12 mg enzyme per g solids, even about 10 mg enzyme per gram solids. The enzyme dose can also depend on yeast expression and activity of the particular enzyme. In some aspects, the dosage is from about 0 to 100 fold excess beyond the concentration of the contaminating mycotoxin.

In some aspects, the mycotoxin contaminated composition is treated with a high dose of mycotoxin mitigating enzyme, for example, about 100 to about 1000 mg lysate containing enzyme per gram solids of the contaminated composition. In some aspects, the mycotoxin contaminated composition is treated with a low dose of mycotoxin mitigating enzyme, for example, about 5 to about 50 mg enzyme per gram solids.

The dose can vary from the above parameters depending on the original concentration of mycotoxin in the contaminated composition. For example, highly contaminated material may require a correspondingly higher dose than less contaminated material. The level of contamination may be determined by measuring the contamination in the feedstock on a parts per million basis and a dose may be determined based on that level of contamination. For example, in treating a composition derived from a contaminated feedstock with a cell lysate, the dose may be stated as the number of milligrams of lysate per gram of solids in the treated composition per parts per million contaminant level of the feedstock. The dose may be 1-1000 mg of lysate, even 10-500 mg of lysate, even 50-500 mg lysate, even 10-50 mg of lysate per gram of solids in the treated composition per parts per million contamination in the feedstock. For example, a fermentation composition in a corn fermentation facility may be treated with a dose of 10 mg of lysate as follows. The contamination level, e.g, of DON in the corn feedstock may be measured as, e.g., 5 ppm. The dose would then be calculated as 10 mg/g solids/ppm contamination× #grams of solids×5 ppm contamination to yield a dose of 50 mg/g of solids in the fermenter.

Vectors and Host Cells

Methods for expressing a mycotoxin modulating enzyme in a yeast host cell can comprise transforming a host cell with an integration vector comprising a nucleic acid having one or more expression cassettes comprising a nucleic acid encoding a mycotoxin modulating enzyme, and a targeting nucleic acid that directs insertion of the integration vector into a particular location of the genome of the host cell by homologous recombination. The transformed host cell produces the mycotoxin modulating enzyme.

Vectors are provided for transforming a microorganism into an engineered microorganism for producing a mycotoxin mitigating enzyme. The vectors can comprise a nucleic acid sequence encoding one or more mycotoxin mitigating enzymes selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, xylanase, DepA/DepB, and 2cys-peroxiredoxin. For example, the vector can include the nucleic acid sequence of SEQ ID NO: 1 which encodes deoxynivalenol hydroxylase. In some embodiments, the vector further comprises one or more nucleic acid sequences encoding a KdX gene (SEQ ID NO: 2) or KdR gene (SEQ ID NO: 3). Alternatively, the vector can include a nucleic acid sequence which comprises the promoter, terminator, tag, and gene encoding the mycotoxin mitigating enzyme (SEQ ID NO: 10). In some aspects, the vector is selected from the group consisting of pYEDP60 (*S. cerevisiae*), pPINK (*P. pastoris*), or pCWori (bacterial).

Microorganisms useful herein are transformed with a vector comprising the nucleic acid sequence encoding a mycotoxin mitigating enzyme. The microorganism can be a yeast or a bacteria. The microorganism can be engineered to express and/or excrete a mycotoxin mitigating enzyme. The microorganism may be used solely to decontaminate a feedstock, process stream, or product. The microorganism may be an organism that is also used to carry out a primary conversion of a feedstock to a desired product. The microorganism may be an accessory microorganism that is cocultured with another microorganism so that it provides the decontaminating enzyme while the other organism produces a desired product. The microorganism can be separately cultured and added as a whole microorganism, whole broth, as a lysate, or isolated enzyme. Illustratively, the microorganism can be a yeast used in fermenting a feedstock in a bioethanol production facility or can be a yeast used in steeping corn for production of corn starch. The yeast can be, for example, a genetically modified commodity yeast or a genetically modified consolidated bioprocessing yeast. The yeast can be, for example, *S. cerevisiae* or *P. pastoris*.

The microorganisms comprising such vectors are useful in expressing deoxynivalenol hydroxylase or another mycotoxin mitigating enzyme during fermentation, for example, in beer, and/or in distiller's grain sourced from post-fermentation stillage, wherein fermentation feedstock is contaminated with a mycotoxin such as deoxynivalenol.

EXAMPLES

The following examples are provided for illustrative purposes only and are not intended to limit the scope of the invention.

Example 1: Deoxynivalenol Hydroxylase Expression in *P. pastoris* and S. *Cerevisiae* Yeast DNA Resuspension:

DdnA DNA, KdX DNA, and KdR DNA, obtained from GenScript, is centrifuged at 6,000×g for 1 min at 4° C. 20 μL sterilized deionized water is added to dissolve DNA. The vial is vortexed for 1 min. The solution is then heated at 50° C. for 15 min to ensure DNA is dissolved in liquid, then stored at −20° C. until use.

Plasmid *E. coli* Transformation:

Chemically competent DH5a cells are thawed on ice for 20-30 min. DdnA DNA (1-2 μL) is added to chemically competent cells and gently mixed by flicking the bottom of the tube. The mixture is incubated on ice for 20-30 minutes, then heat shocked for 30-60 seconds at 42° C. The mixture is placed back on ice for 2 min and the cells are allowed to recover. 250-1000 μL of LB or SOC media without antibiotic is added to the mixture and incubated for 45-60 min at 37° C. Following incubation, the sample is gently centrifuged at 4,000×g for 1 min at 4° C. Three quarters of the remaining liquid is removed and the cell pellet is resuspended with the remainder liquid. The liquid is plated on room temperature LB agar plates with selective antibiotic and placed in a 37° C. incubator overnight (plates are pulled within 12-18 hours). Colonies are selected and grown in liquid culture. Freezer stock is made and DNA sequence is checked.

Transferring Gene from *E. coli* Plasmid to Yeast Plasmid:

DdnA, KdX, and KdR sequences were codon biased for expression in a yeast host, and had a histidine or FLAG tag to the C-terminal side. A secretion signal can also be added to the 5' side of the DNA to signal secretion in the yeast.

Restriction Enzyme Digestion: 5' End (Start of Gene) Cut with EcoRI and 3' End (End of Gene) Cut with RsrII, SphI, StuI, KpnI, NaeI, FseI, or SwaI. Enzyme and DNA are mixed (Both Yeast Plasmid and *E. coli* Plasmid [Individually]) at 37° C. for 2-24 hr.

2 μL DNA
1 μL 10× Restriction Enzyme Buffer
5 μL Sterile Water
1 μL EcoRI
1 μL RE2* (*or any appropriate $2^{nd}$ restriction enzyme)

A 1.5% agarose gel is run to separate cleaved gene from plasmid and to clean up plasmid to keep it from ligating back to itself.

The purified cut pieces are then ligated:

2 μL 5× Ligation buffer
0.5 μL T4 DNA Ligase
1 μL Yeast Plasmid

1 μL Insert Gene
5.5 μL Sterile Water

Ingredients are mixed gently, then centrifuged to get all liquid to bottom of tube, and incubated at 25° C. for 1-2 hours or 16° C. overnight. The yeast plasmid is transformed into E. coli, grown, sequenced, and purified for transformation of the plasmid DNA into Yeast.

Additional Methods for Construction of the Final Yeast Vector:

Gateway cloning protocol is used to combine all three genes into a single construct for placement in to a yeast vector to be integrated in to the yeast genome. Generally the protocol is as follows:

Following solutions are mixed:
  1 uL destination vector
  75 ng of each gene or insert in a 2:1 ratio dependent upon origination of insert solution
  2 uL T4 DNA Ligase Buffer
  1-2 uL Golden Gate Assembly Mix
  Nuclease Free Water to 20 uL Once mixed well, the reaction undergoes the following protocol in a thermocycler: either: 37 C for 1 hr, followed by 60° C. for 5 min or (37° C. for 1 min, 16° C. for 1 min) for 30-35 cycles followed by a 60° C. incubation for 5 min. These constructs are then transformed into E. coli for primary screening prior to transformation into yeast.

Plasmid Yeast Transformation:

Yeast from YPD plate are inoculated into 20 mL of YPD medium in 100 mL sterile flask and grown overnight with shaking (200-250 rpm) at 30° C. to reach stationary phase. The culture is diluted into 100 mL of YPD medium in 500 mL flask to $OD_{600}$ of ~0.3, and grown with shaking at 30° C. for 3-6 hr, $OD_{600}$. The culture should double and not surpass 1.5 ($OD_{600}$). Cells are harvested by centrifugation at room temperature for 5 min at 5,000 rpm. Supernatant is discarded and cells resuspended in 50 mL of sterile water. Centrifugation is repeated. Supernatant is discarded and the cell pellet resuspended in 1 mL of transformation buffer (cells are now ready for transformation). Salmon testes DNA is aliquoted at 10 μL of 10 mg/mL into each transformation tube, along with 0.1 μg of yeast plasmid DNA. 100 μL of competent cells are added and the mixture is vortexed. 600 μL of PLATE Buffer is added and the mixture is vortexed again. The mixtures are incubated for 30 min at 30° C. with shaking. 10% DMSO is added, and the mixture is heat shocked for 15 min at 42° C. The mixture is spun to pellet the cells, and the supernatant is removed. The cells are resuspended in 500 μL of sterile water and plated at 100 μL on appropriate SC selective plates without required supplement. Plates are then incubated at 30° C. for 2-3 days until colonies appear.

Western Blotting for Protein Expression Testing:

The deoxynivalenol hydroxylase enzyme is tagged with a C-terminal histidine or FLAG tag which is probed for in a Western blot. Western blot analysis is used for monitoring protein (enzyme) expression during bacterial or yeast growth.

Cellular growth is centrifuged and the cell pellet (solids) and the supernatant (aqueous) are separated and saved separately. Cell pellets are resuspended in a general low molar TRIS buffer and treated to break open cells (for example, by bead beating, sonicating, homogenizing, chemical treatments). The solution is centrifuged following cell rupture in an ultra-centrifuge to separate the cell debris and the soluble protein, and both fractions are kept.

The soluble aqueous phase can be run as is, or enriched further by running the soluble protein over an affinity column for a His-Tag or FLAG-Tag (Nickel or FLAG column). The protein is eluted off the column using increasing salt concentrations resulting in an enriched fraction. This fraction, or any of the previous fractions are then run on an SDS-PAGE protein gel—12%-18% acrylamide gels, for example. Once the gel has run under standard conditions, the proteins are transferred to a membrane (PVDF) and blocked with rehydrated milk powder. After blocking, a primary antibody to the His- or FLAG-Tag is added and allowed to incubate overnight at 16° C.

Following primary incubation, the membrane is washed several times before adding secondary antibodies which have a horseradish peroxidase attached. Secondary incubation is between 1 and 3 hours at room temperature.

The membrane is again washed, then signal compound is added to produce light at any band that the antibodies attached to. Tagged proteins are visualized on a gel box.

Example 2: Addition of Deoxynivalenol Hydroxylase Expressing *P. pastoris* or *S. cerevisiae* to Corn Steep Whole corn contaminated with DON is filled into three large steeping tanks (steeps) and soaked in hot water 30 to 48 hours to begin breaking the starch and protein bonds. *P. pastoris* expressing deoxynivalenol hydroxylase and *S. cerevisiae* expressing deoxynivalenol hydroxylase are added, one to each of the steep tanks, and enzyme levels are monitored in each of the two steep tanks to ensure proper expression. The third steep tank is held under identical conditions but lacks addition of either microorganism. At 6 hour increments over the duration of the steep, water samples are obtained and DON levels are assessed in each sample. Over time, DON levels decrease in the steep water from treated tanks.

Example 3: Addition of Deoxynivalenol Hydroxylase Expressing *S. cerevisiae* to Fermentation Tank Ground corn or other feedstock is combined with water to form a slurry, and the pH of the slurry mixture is adjusted as needed. *S. cerevisiae* engineered to express deoxynivalenol hydroxylase is added to the fermenter along with an amount of yeast starter effective to produce a commercially significant quantity of ethanol. The fermentation is carried out for about 88 hours. Enzyme levels are monitored to ensure expression and proper levels to mitigate DON contamination. Samples of the solids are obtained at regular intervals to assess DON levels. Resulting post-fermentation products show commercially acceptable levels of DON (ppm).

Example 4: Addition of Deoxynivalenol Hydroxylase Via Lysate in Fermentation

A 72 hour fermentation was performed on DON contaminated corn in the presence or absence of a cell lysate of yeast genetically modified to produce deoxynivalenol hydroxylase (Ddna—the main catalytic enzyme), Kdr, or Kdx, the latter two of which are accessory recycling enzymes. The yeast cultures were grown to a late logarithmic growth phase or early stationary growth phase while producing mycotoxin mitigating enzymes, and then lysed. The yeast lysates were mixed to a 1:1:1 ratio, such that the final dosing was equal for each enzyme at 5-10 mg protein (which contained the enzyme) per gram solids, and added to the fermentation.

Results were analyzed for mycotoxin concentration and ethanol titer. DON in ppm was measured by LC/MS on all fermentation solids after 88 h of fermentation and dry down. Comparative measurements were made based on untreated control fermentations done at the same time as the treated fermentations. The data in FIG. 1 shows that the enzymes are active in the yeast lysate and available to the corn, thus reducing DON contamination, and pose no harm to the final ethanol titer. Compared to the untreated control, DON levels in the treated samples were reduced by 94%. The % mitigated is relative to the untreated control fermentation, and not based on the starting to ending fermentation DON concentrations (ppm).

Figure 3:
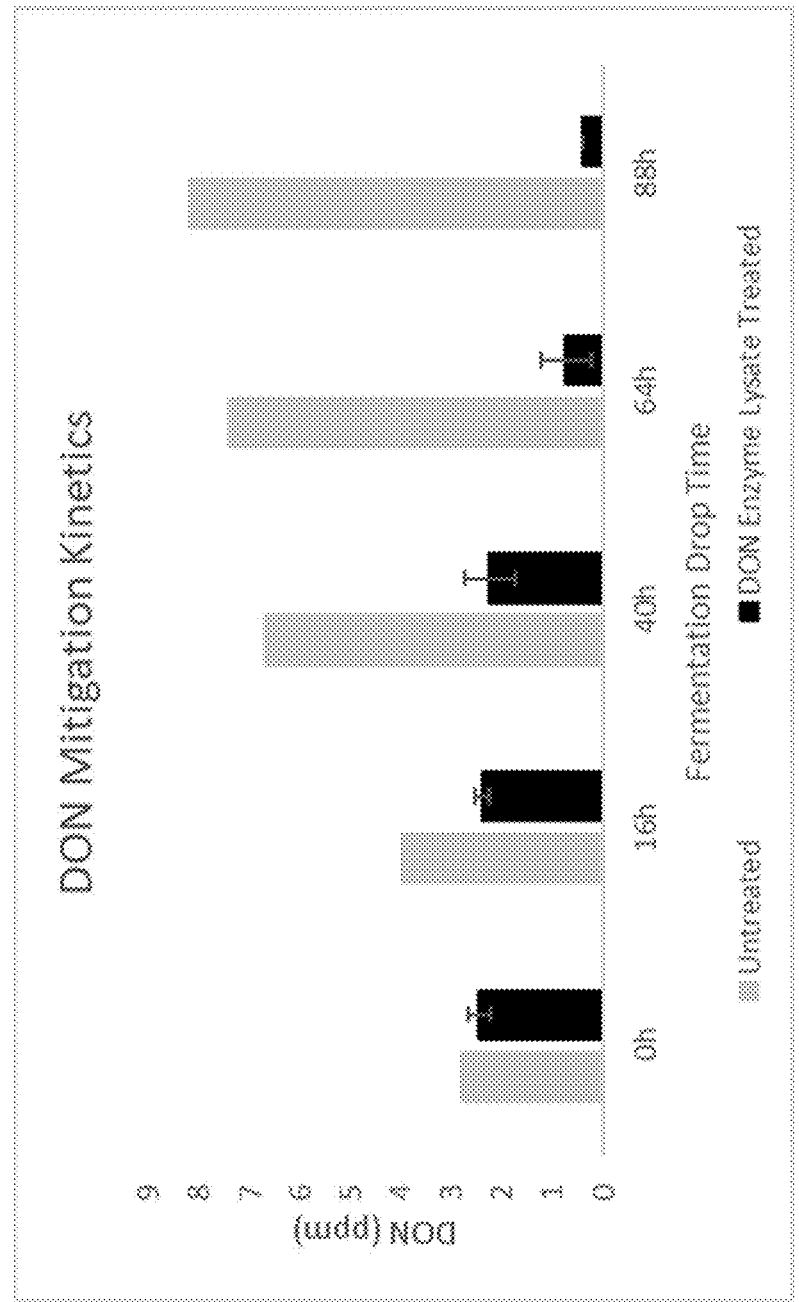
FIG. 3 shows DON levels (ppm) over time (0 to 88 hours fermentation) with yeast lysate containing deoxynivalenol hydroxylase compared to a control fermentation in the absence of enzyme.

In a similar experiment, 88 hour fermentations were performed on DON contaminated corn in the presence or absence of a cell lysate obtained from a yeast genetically modified to produce deoxynivalenol hydroxylase. At various timepoints during the fermentation, DON levels were assessed in the untreated control and treated fermenters using LC/MS. FIG. 3 shows DON mitigation kinetics over the 88 hour fermentations. Over time, the levels of DON in the enzyme treated fermentations decrease to less than 2 ppm.

Example 5: Whole Stillage Treatment

Following distillation and removal of the ethanol fraction, mycotoxin-contaminated whole stillage is treated over a relatively shorter time with a high dose, e.g. 100-1000 mg whole cell lysate obtained from *S. cerevisiae* genetically modified to produce a mycotoxin mitigating enzyme containing enzyme per gram solids, or a relatively longer time at a lower dose, e.g. 5-50 mg whole cell lysate enzyme per gram solids. Samples are tested every 2-4 hours to determine mycotoxin concentration. Whole stillage after treatment exhibits commercially acceptable levels of DON (ppm).

Example 6: Secondary Whole Stillage Fermentation

Whole stillage obtained after ethanol distillation is subjected to a secondary fermentation with an ethanologen expressing one or more mycotoxin mitigating enzymes. Samples are obtained every 4-6 hours during the fermentation and assessed for mycotoxin levels. During the second fermentation, the mycotoxin is reduced. Resulting feed products show commercially acceptable levels of mycotoxin presence.

Example 7: Treatment of the Solubles and Syrup

In a first vat, lysate of microorganisms producing mycotoxin mitigating enzymes is dosed into the syrup tank and allowed to mitigate mycotoxin over the holding time and prior to dosing the feed in the drying process.

In a second vat, a live microorganism expressing mycotoxin mitigation enzymes is grown in the syrup or solubles. Both experiments demonstrate effectiveness of treatment of the partial stream containing mycotoxin which remains in the wet-cake or feed solids after separation of the two streams.

In further experiments, two vats containing mycotoxin contaminated thin stillage streams are treated with whole cell lysate from a mycotoxin mitigating enzyme producing microorganism or live microorganism expressing mycotoxin mitigation enzymes, respectively. A third vat is subjected to identical conditions but is not treated with enzyme. The three vats are incubated for 48-60 hours and samples are obtained from each vat every 4-8 hours to track mycotoxin levels. Over time, mycotoxin levels decrease to acceptable levels.

Example 8: Addition of Aflatoxin Oxidase Expressing *S. cerevisiae* and *P. pastoris* to Wheat Steep Wheat contaminated with aflatoxin is filled into three large steeping tanks (steeps) and soaked in hot water 30 to 48 hours to begin breaking the starch and protein bonds. *P. pastoris* expressing aflatoxin oxidase and *S. cerevisiae* expressing aflatoxin oxidase are added, one to each of the steep tanks, and enzyme levels are monitored in each of the two steep tanks to ensure proper expression. The third steep tank is held under identical conditions but lacks addition of either microorganism. At 6 hour increments over the duration of the steep, water samples are obtained and aflatoxin levels are assessed in each sample. Over time, aflatoxin levels decrease in the steep water from treated tanks.

Example 9: Secondary Whole Stillage Fermentation

Whole stillage obtained after ethanol distillation is subjected to a secondary fermentation with an ethanologen expressing 3-O acetyltransferase. Samples are obtained every 4-6 hours during the fermentation and assessed for DON levels. During the second fermentation, the levels of DON are reduced. Resulting feed products show commercially acceptable levels of mycotoxin presence.

Example 10: Addition of DepA and DepB Expressing *S. cerevisiae* to Fermentation Tank Ground corn or other feedstock is combined with water to form a slurry, and the pH of the slurry mixture is adjusted as needed. *S. cerevisiae* engineered to express DepA and DepB is added to the fermenter along with an amount of yeast starter, i.e. ethanologen, effective to produce a commercially significant quantity of ethanol. Cofactors are added at the start of fermentation, including pyrroloquinoline quinone (PQQ) or methoxatin as purified powder or fruit extract. The fermentation is carried out for about 88 hours. Enzyme levels are monitored to ensure expression and proper levels to mitigate DON contamination. Samples of the solids are obtained at regular intervals to assess DON levels. Resulting post-fermentation products show commercially acceptable levels of DON (ppm).

Example 11: Addition of Yeast Lysate Containing DepA and DepB to Fermentation Tank Ground corn or other feedstock is combined with water to form a slurry, and the pH of the slurry mixture is adjusted as needed. *S. cerevisiae* engineered to express DepA and DepB is lysed and the lysate is added to the fermenter along with an amount of a yeast starter effective to produce a commercially significant quantity of ethanol. Cofactors are added at the start of fermentation, including pyrroloquinoline quinone (PQQ) or methoxatin as purified powder or fruit extract. The fermentation is carried out for about 88 hours. Enzyme levels are monitored and additional lysate added as needed to decreased DON contamination. Samples of the solids are obtained at regular intervals to assess DON levels. Resulting post-fermentation products show commercially acceptable levels of DON (ppm).

Additional Examples

1. A livestock feed composition comprising distiller's grain sourced from feedstock fermented in the presence of a microorganism expressing an enzyme to mitigate mycotoxin contamination, or a cell lysate comprising a microorganism expressing an enzyme to mitigate mycotoxin contamination, wherein the levels of mycotoxin in the livestock feed composition are decreased relative to the levels of mycotoxin in a livestock feed composition obtained from a feedstock fermented in the absence of a microorganism expressing an enzyme to mitigate mycotoxin contamination or a cell lysate comprising a microorganism expressing an enzyme to mitigate mycotoxin contamination.

2. A livestock feed composition comprising distiller's grain sourced from post-fermentation stillage, wet cake, and/or syrup stream treated with an enzyme to mitigate mycotoxin contamination, wherein the levels of mycotoxin in the livestock feed composition are decreased relative to the levels of mycotoxin in a livestock feed composition obtained from untreated post-fermentation stillage, wet cake, and/or syrup stream, and wherein the enzyme is obtained by inoculating post-fermentation stillage, wet cake, and/or syrup stream with a microorganism expressing an enzyme to mitigate mycotoxin contamination or by adding to the post-fermentation stillage, wet cake, and/or syrup stream a cell lysate comprising a microorganism expressing an enzyme to mitigate mycotoxin contamination.

3. A livestock feed composition comprising distiller's grain sourced from beer treated with an enzyme to mitigate mycotoxin contamination, wherein the levels of mycotoxin in the livestock feed composition are decreased relative to the levels of mycotoxin in a livestock feed composition obtained from untreated beer, and wherein the enzyme is obtained by inoculating beer with a microorganism expressing an enzyme to mitigate mycotoxin contamination or by adding to the beer a cell lysate comprising a microorganism expressing an enzyme to mitigate mycotoxin contamination.

4. The livestock feed composition of any one of examples 1-3, wherein the mycotoxin is selected from the group consisting of aflatoxin, Ochratoxin A, patulin, T-2, HT-2, beauvericin, neosolaniol, nivalenol, deoxynivalenol, 3-ADON, trichothecene, ochratoxin, and zearalenone.

5. The livestock feed composition of any one of examples 1-3, wherein the enzyme is selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, xylanase, DepA/DepB, lactono hydrolase, Zearalenone hydrolase, and 2cys-peroxiredoxin.

6. The livestock feed composition of example 1, wherein the microorganism is a yeast.

7. The livestock feed composition of example 6, wherein the yeast is *S. cerevisiae*.

8. The livestock feed composition of example 6, wherein the yeast is *Pichia pastoris*.

9. The livestock feed composition of claim 6, wherein the yeast is a non-genetically modified commodity yeast or a consolidated bioprocessing yeast.

10. The livestock feed of any one of example 1-3, wherein the enzyme is expressed by a yeast host cell.

11. The livestock feed composition of any one of examples 1-10, wherein the levels of mycotoxin are less than about 10 ppm.

12. The livestock feed composition of any one of examples 1-10, wherein the levels of mycotoxin are less than about 5 ppm.

13. The livestock feed composition of any one of examples 1-10, wherein the levels of mycotoxin are less than about 2 ppm.

14. A method of fermentation comprising inoculating a feedstock with one or more yeast strains, wherein at least one yeast strain expresses one or more mycotoxin mitigating enzymes.

15. The method of example 14, further comprising fermenting the feedstock to produce ethanol and distiller's grain.

16. The method of example 14, wherein the mycotoxin mitigating enzyme is deoxynivalenol hydroxylase.

17. The method of example 16, wherein the feedstock is contaminated with deoxynivalenol.

18. The method of example 15, wherein the levels of deoxynivalenol in the distiller's grain are decreased relative to the levels of deoxynivalenol in distiller's grain obtained from a feedstock fermented in the absence of a yeast expressing deoxynivalenol hydroxylase.

19. A method of mitigating mycotoxin contamination in livestock feed, the method comprising fermenting a feedstock in the presence of a microorganism expressing an enzyme selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, Zearalenone hydrolase, xylanase, DepA/DepB, and 2cys-peroxiredoxin.

20. A method of mitigating mycotoxin contamination in livestock feed, the method comprising contacting post-fermentation stillage, wet cake, and/or syrup stream with an enzyme to mitigate mycotoxin contamination, wherein the levels of mycotoxin in the livestock feed composition are decreased relative to the levels of mycotoxin in a livestock feed composition obtained from untreated post-fermentation stillage, wet cake, and/or syrup stream, wherein the enzyme is obtained by inoculating post-fermentation stillage, wet cake, and/or syrup stream with a microorganism expressing an enzyme to mitigate mycotoxin contamination or by adding to the post-fermentation stillage, wet cake, and/or syrup stream a cell lysate comprising a microorganism expressing an enzyme to mitigate mycotoxin contamination.

21. A method of mitigating mycotoxin contamination in livestock feed, the method comprising contacting beer with an enzyme to mitigate mycotoxin contamination, wherein the levels of mycotoxin in the livestock feed composition are decreased relative to the levels of mycotoxin in a livestock feed composition obtained from untreated pre-distillation whole stillage, and wherein the enzyme is obtained by inoculating beer with a microorganism expressing an enzyme to mitigate mycotoxin contamination or by adding to the beer a cell lysate comprising a microorganism expressing an enzyme to mitigate mycotoxin contamination.

22. The method of example 21, wherein the step of contacting beer with an enzyme comprises lysing yeast expressing the enzyme and adding the lysate to the beer.

23. A vector comprising a nucleic acid sequence of SEQ ID NO: 1, or a nucleic acid having at least about 95% sequence identity to SEQ ID NO: 1, encoding deoxynivalenol hydroxylase (Ddna).

24. The vector of example 23, further comprising one or more nucleic acid sequences encoding a KdR gene, KdX gene, or Ddna gene.

25. The vector of example 23, selected from the group consisting of pYEDP60 (*S. cerevisiae*), pPINK (*P. pastoris*), or pCWori (bacterial) or other custom vector for integration into yeast genome.

26. A microorganism expressing a vector of example 23.

27. The microorganism of example 26 selected from a yeast and a bacteria.

28. The microorganism of example 26, wherein the yeast is *S. cerevisiae*.

29. The microorganism of example 26, wherein the yeast is *Pichia pastoris*.

30. The microorganism of example 26, wherein the bacteria is *E. coli*, lactobacillus, or zymomonas.

31. The microorganism of example 26, wherein the yeast is a non-genetically modified commodity yeast or a consolidated bioprocessing yeast.

32. A vector comprising a nucleic acid sequence of SEQ ID NO: 10, or a nucleic acid having at least about 95% sequence identity to SEQ ID NO: 10.

33. A microorganism expressing a vector of claim 32.

34. The microorganism of example 33 selected from a yeast and a bacteria.

35. The microorganism of example 33, wherein the yeast is *S. cerevisiae*.

36. The microorganism of example 33, wherein the yeast is *Pichia pastoris*.

37. The microorganism of example 33, wherein the bacteria is *E. coli*, lactobacillus, or zymomonas.

38. The microorganism of example 33, wherein the yeast is a non-genetically modified commodity yeast or a consolidated bioprocessing yeast.

39. Use of microorganism comprising a vector of any one of examples 23 to 26 in expressing deoxynivalenol hydroxylase during fermentation, in beer, and/or in distiller's grain sourced from post-fermentation stillage, wherein fermentation feedstock is contaminated with deoxynivalenol.

40. A method for expressing a mycotoxin modulating enzyme in a yeast host cell comprising: transforming the host cell with an integration vector comprising a nucleic acid having one or more expression cassettes comprising a nucleic acid encoding a mycotoxin modulating enzyme, and a targeting nucleic acid that directs insertion of the integration vector into a particular location of the genome of the host cell by homologous recombination, wherein the transformed host cell produces the mycotoxin modulating enzyme.

41. A microorganism expressing deoxynivalenol dehydroxylase, wherein the microorganism is *Pichia pastoris* or *S. cerevisiae.*

42. A method of mitigating mycotoxin contamination in a feed or food product produced in a dry mill or wet mill grain processing facility, the method comprising: contacting a feedstock or process stream of a dry mill or wet mill grain processing facility with an enzyme selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, Zearalenone hydrolase, xylanase, DepA/DepB, and 2cys-peroxiredoxin; and producing a food or feed product from a process stream downstream of said contacting step.

43. The method of example 42, wherein contacting comprises contacting whole grain, cracked grain, steeped grain, steep water, steep liquor, flour, slurry, beer, whole stillage, wet cake, thin stillage, concentrated thin stillage, defatted concentrated thin stillage (e.g. syrup), germ, oil, fiber, protein, starch, or combinations thereof.

44. The method of example 42, wherein contacting comprises contacting the feed stock or process stream with a microorganism expressing an enzyme selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, Zearalenone hydrolase, xylanase, DepA/DepB, and 2cys-peroxiredoxin, a broth containing a such a microorganism, a lysate formed by lysing a such a microorganism, a concentrate of such a microorganism or lysate, or combinations thereof.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

SEQUENCE LISTING

DdnA DNA SEQ ID NO: 1
kdX Protein Modified DNA Sequence SEQ ID NO: 2
kdR Protein Modified DNA Sequence SEQ ID NO: 3
pUC57 Cloning Vector SEQ ID NO: 4
pPink-HC (High Copy *P. pastoris* vector) SEQ ID NO: 5
pPink-LC (Low Copy Vector for *P. pastoris*) SEQ ID NO: 6
pPink-αHC (High Copy P. *Pastoris* Vector) SEQ ID NO: 7
pJKW1148 (same backbone as the pYEDP60 plasmid) SEQ ID NO: 8
pCWori SEQ ID NO: 9
Single Expression Cassette of Ddna, Kdx, Kdr expression SEQ ID NO: 10

What is claimed is:

1. A livestock feed composition comprising distiller's grain sourced from deoxynivalenol (DON)-contaminated feedstock selected from the group consisting of corn, sorghum, or wheat fermented in the presence of a lysate derived from a microorganism expressing deoxynivalenol hydroxylase (Ddna), wherein levels of DON in the livestock feed composition are decreased relative to levels of DON in a livestock feed composition obtained from the same feedstock fermented in the absence of the lysate.

2. The livestock feed composition of claim 1, wherein the microorganism expresses an enzyme encoded by: a polynucleotide comprising a nucleotide sequence set forth in SEQ ID NO: 1, encoding deoxynivalenol hydroxylase (Ddna), or a polynucleotide comprising a nucleotide sequence having at least about 95% sequence identity to SEQ ID NO: 1.

3. The livestock feed composition of claim 2, wherein the microorganism further expresses enzymes encoded by a KdR gene and a KdX gene.

4. The livestock feed composition of claim 3, wherein the KdR gene, KdX gene, and Ddna gene are provided on an expression cassette comprising a polynucleotide comprising a nucleotide sequence set forth in SEQ ID NO: 10, or a polynucleotide comprising a nucleotide sequence having at least about 95% sequence identity to SEQ ID NO: 10.

5. The livestock feed composition of claim 1, wherein the microorganism is a yeast.

6. The livestock feed composition of claim 5, wherein the yeast is *S. cerevisiae*.

7. The livestock feed composition of claim 5, wherein the yeast is *Pichia pastoris*.

8. The livestock feed composition of claim 1, wherein the microorganism is a bacterium.

9. The livestock feed composition of claim 1, wherein the feedstock is ground corn.

10. The livestock feed composition of claim 1, wherein the levels of mycotoxin are decreased to less than about 2 ppm.

11. A method of producing the livestock feed of claim 1, the method comprising: fermenting a DON contaminated feedstock in the presence of a lysate obtained from a microorganism expressing deoxynivalenol hydroxylase.

12. The method of claim 11, wherein the lysate is obtained from a microorganism expressing an enzyme encoded by a polynucleotide comprising a nucleotide sequence set forth in SEQ ID NO: 1, encoding deoxynivalenol hydroxylase (Ddna), or a polynucleotide comprising a nucleotide sequence having at least about 95% sequence identity to SEQ ID NO: 1.

13. The method of claim 12, wherein the lysate is obtained from a microorganism further expressing the proteins encoded by a KdR gene or KdX gene.

14. The method of claim 13, wherein the KdR gene, KdX gene, and Ddna gene are provided on an expression cassette comprising a polynucleotide comprising a nucleotide sequence set forth in SEQ ID NO: 10, or a polynucleotide comprising a nucleotide sequence having at least about 95% sequence identity to SEQ ID NO: 10.

15. The method of claim 11, wherein the levels of mycotoxin in the livestock feed are less than about 2 ppm.

* * * * *